US011970892B2

(12) United States Patent
Throop

(10) Patent No.: US 11,970,892 B2
(45) Date of Patent: Apr. 30, 2024

(54) DOOR STOP SYSTEM

(71) Applicant: Summit Products, Inc., Altoona, IA (US)

(72) Inventor: Jeremy Michael Throop, Altoona, IA (US)

(73) Assignee: Summit Products, Inc., Altoona, IA (US)

( * ) Notice: Subject to any disclaimer, the term of this patent is extended or adjusted under 35 U.S.C. 154(b) by 44 days.

(21) Appl. No.: 17/663,678

(22) Filed: May 17, 2022

(65) Prior Publication Data

US 2022/0372806 A1 Nov. 24, 2022

Related U.S. Application Data

(60) Provisional application No. 63/191,054, filed on May 20, 2021.

(51) Int. Cl.
*E05D 11/06* (2006.01)

(52) U.S. Cl.
CPC ......... *E05D 11/06* (2013.01); *E05Y 2900/532* (2013.01)

(58) Field of Classification Search
CPC ....... E05D 11/06; E05D 11/062; E05D 3/127; E05D 11/1057; E05D 11/1085; E05Y 2900/532
See application file for complete search history.

(56) References Cited

U.S. PATENT DOCUMENTS 4,301,570 A * 11/1981 Thomas .................. E05D 11/06 16/85
4,574,422 A * 3/1986 Dieudonne ........... E05C 17/203 16/85
5,692,264 A * 12/1997 van der Steur ..... B05B 13/0292 16/374
5,727,287 A * 3/1998 Hosken ................. E05C 17/203 16/334
5,924,170 A * 7/1999 Papke ................. B05B 13/0292 16/334
6,108,866 A * 8/2000 Waynick, Jr. ....... B05B 13/0292 16/374

(Continued)

FOREIGN PATENT DOCUMENTS

AU 2008255168 12/2008

*Primary Examiner* — Robert Sandy
*Assistant Examiner* — Matthew J Sullivan
(74) *Attorney, Agent, or Firm* — BrownWinick Law Firm; Christopher A. Proskey

(57) ABSTRACT

A door stop system is presented for restricting range of motion of a multi-axial hinge having a main link and a secondary link pivotally connected between a first end member and a second end member. In one or more embodiments, the system is configured to be positioned and held within cutout opening of the hinge, between the main link and either the first end member or second end member to restrict the range of motion. In one or more embodiments, the system includes a first stop component, a second stop component configured to be positioned around the secondary link within the cutout opening and connected together by the one or more fasteners. A portion of at least one of the first stop component or second stop component limits the range of motion of the hinge.

32 Claims, 43 Drawing Sheets

(56) References Cited

U.S. PATENT DOCUMENTS

| | | | | |
|---|---|---|---|---|
| 6,176,040 | B1 * | 1/2001 | Sugihara | E05C 17/206 49/394 |
| 6,243,920 | B1 * | 6/2001 | Sauve | E05D 3/18 16/361 |
| 6,334,236 | B1 * | 1/2002 | Kalliomaki | E05D 11/1057 16/83 |
| 6,892,425 | B2 * | 5/2005 | Smith | B05B 13/0292 16/374 |
| 6,948,214 | B2 * | 9/2005 | Spalding | E05D 11/1057 16/83 |
| 7,096,538 | B2 * | 8/2006 | Liang | E05D 3/127 16/366 |
| 7,114,219 | B2 * | 10/2006 | Kiefer | E05D 5/062 16/374 |
| 7,950,109 | B2 * | 5/2011 | Elliott | E05D 3/127 296/146.12 |
| 7,971,320 | B2 * | 7/2011 | Fain | E05D 11/06 16/366 |
| 8,162,386 | B2 * | 4/2012 | Namura | E05D 3/127 16/366 |
| 8,413,382 | B2 * | 4/2013 | Uto | E05D 11/06 49/381 |
| 8,549,711 | B2 * | 10/2013 | Apostoloff | E05D 11/06 16/374 |
| 8,651,556 | B2 * | 2/2014 | Cutting | E05C 17/203 296/146.12 |
| 8,695,164 | B2 * | 4/2014 | Chinta | E05B 63/0056 16/86 C |
| 8,919,858 | B2 * | 12/2014 | Lee | E05C 17/20 296/146.1 |
| 9,169,680 | B2 * | 10/2015 | Kim | E05D 3/02 |
| 10,968,671 | B2 * | 4/2021 | Dey | E05D 11/00 |
| 11,319,008 | B2 * | 5/2022 | Pascoe | B62D 65/026 |
| 11,414,906 | B1 * | 8/2022 | Tallent | E05D 11/1007 |
| 11,597,493 | B2 * | 3/2023 | Gildas | E05F 7/02 |
| 2002/0194705 | A1 | 12/2002 | Liang | |
| 2012/0324795 | A1 * | 12/2012 | Krajenke | E05D 11/06 16/221 |
| 2022/0042362 | A1 * | 2/2022 | Freedman | E05D 5/12 |
| 2022/0235592 | A1 * | 7/2022 | Gutierrez-Fernandez | E05D 11/1085 |
| 2023/0250686 | A1 * | 8/2023 | Elie | E05F 15/63 296/50 |

* cited by examiner

DOOR STOP SYSTEM

CROSS REFERENCE TO RELATED APPLICATION

This application claims priority to U.S. Provisional Patent Application No. 63/191,054, filed May 20, 2021 and titled "DOOR STOP SYSTEM", the entirety of which is hereby fully incorporated by reference herein.

FIELD OF THE DISCLOSURE

This disclosure relates to doors. More specifically and without limitation, this disclosure relates to stops for door systems.

OVERVIEW

Some vehicles, such as some vans, work trucks and the like have rear doors with multi-axial hinges that are designed to permit the doors to rotate approximately 270 degrees. These hinges permit the doors to be moved out of the way and against the sides of the vehicle when they are open. This is very nice in some applications as the doors can be moved out of the way when they are open. This may also facilitate easier access to the vehicle. However, the 270 degrees freedom of movement provided by multi-axial hinges creates substantial problems in instances where accessories are mounted on the exterior of the door. Some example accessories include ladders, bike racks, cargo carriers, and spare tire carriers to name a few. When these accessories are mounted on a door capable of moving 270 degrees, the accessory may contact the body of the vehicle and cause scratching, denting, or other damage. Some solutions to this problem place rubber door stops on the either the side of the vehicle or accessory to provide a cushion between the door and the side of the vehicle. However, these door stops are unsightly and may not prevent denting, scratching, rubbing or other damage over time or when doors are opened with sufficient force.

Therefore, for all the reasons stated above, and the reasons stated below, there is a need in the art for a door stop system that improves upon the state of the art. Thus, it is an object of the disclosure to provide a door stop system that improves upon the state of the art.

Another object of the disclosure is to provide a door stop system that may be installed in vehicles.

Yet another object of the disclosure is to provide a door stop system that is easy to use.

Another object of the disclosure is to provide a door stop system that can restrict range of motion of a door.

Yet another object of the disclosure is to provide a door stop system that can be used to adjust the range of motion of a door.

Another object of the disclosure is to provide a door stop system that prevents contact with an exterior of the vehicle.

Yet another object of the disclosure is to provide a door stop system that may be installed in a wide variety of vehicles.

Another object of the disclosure is to provide a door stop system that is durable.

Yet another object of the disclosure is to provide a door stop system that is robust.

Another object of the disclosure is to provide a door stop system that is easy to install.

Yet another object of the disclosure is to provide a door stop system that is relatively inexpensive.

Another object of the disclosure is to provide a door stop system that is hidden from view.

Yet another object of the disclosure is to provide a door stop system that is high quality.

These and other objects, features, or advantages of the disclosure will become apparent from the specification, figures, and claims.

SUMMARY OF THE DISCLOSURE

In one or more embodiments, a door stop system is presented for restricting range of motion of a door. In one or more embodiments, the system is configured to restrict a range of motion of a multi-axial hinge of the door. In one or more arrangements, the multi-axial hinge has a main link and a secondary link pivotally that are each connected between a first end member and a second end member. In one or more embodiments, the system is configured to be positioned and held within a cutout opening of the hinge, between the main link and either the first end member or second end member to restrict the range of motion.

In one or more embodiments, the system includes a first stop component, a second stop component, and one or more fasteners configured to connect the first stop component to the second stop component. The first stop component and second stop component are configured to be positioned around secondary link and connected together by the one or more fasteners. When the first stop component and second stop component are positioned around secondary link and connected together, a portion of at least one of the first stop component or second stop component extend through a cutout opening positioned at an end of the main link. The portion of at least one of the first stop component and second stop component limits the range of motion of the hinge.

BRIEF DESCRIPTION OF THE DRAWINGS

The figures show the arrangements described.

DETAILED DESCRIPTION OF THE DISCLOSURE

Figure 1:
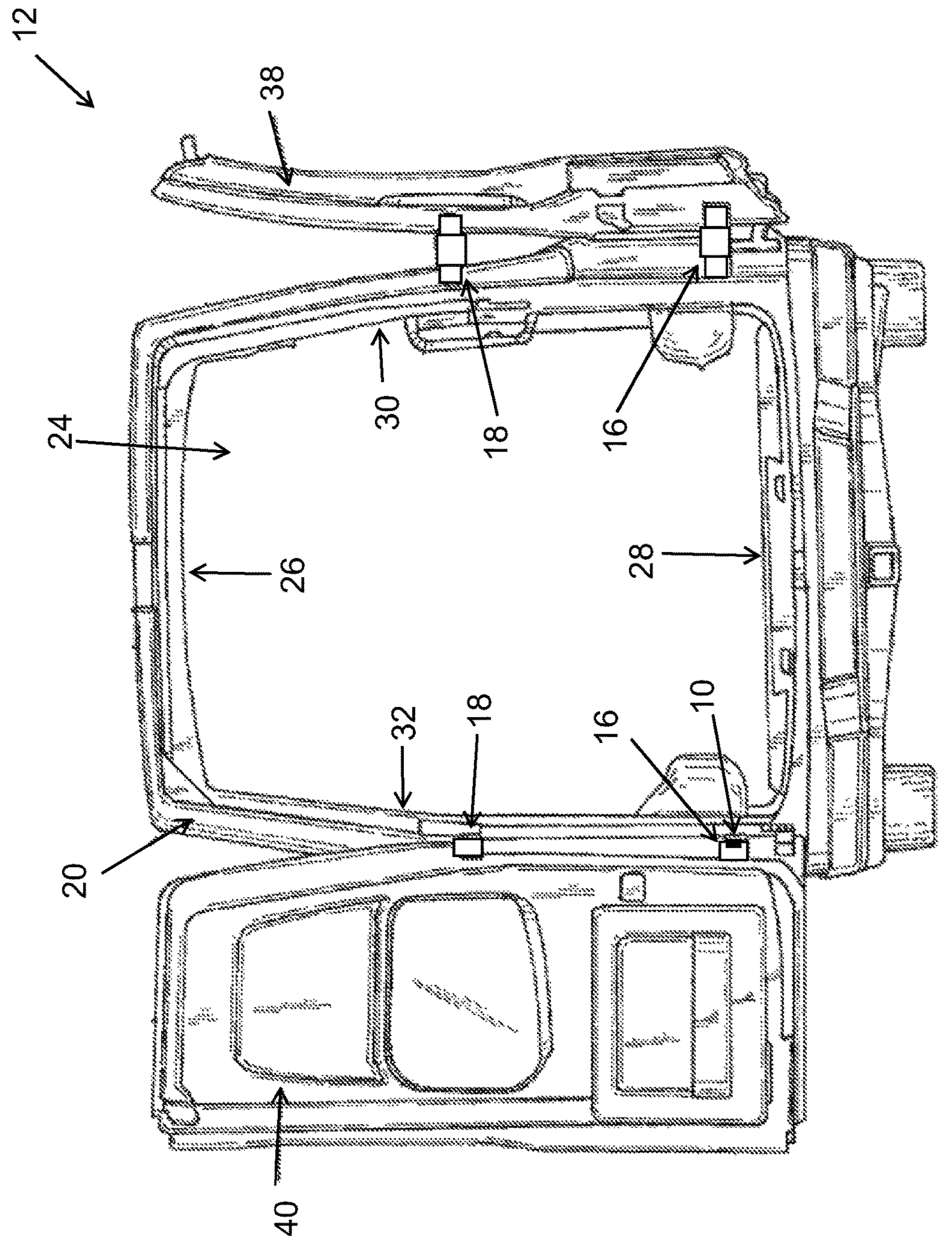
FIG. 1 shows a rear view of a vehicle having rear doors with multi-axial hinges and a door stop system installed on one of the multi-axial hinges, in accordance with one or more embodiments of the present disclosure.
Figure 2:
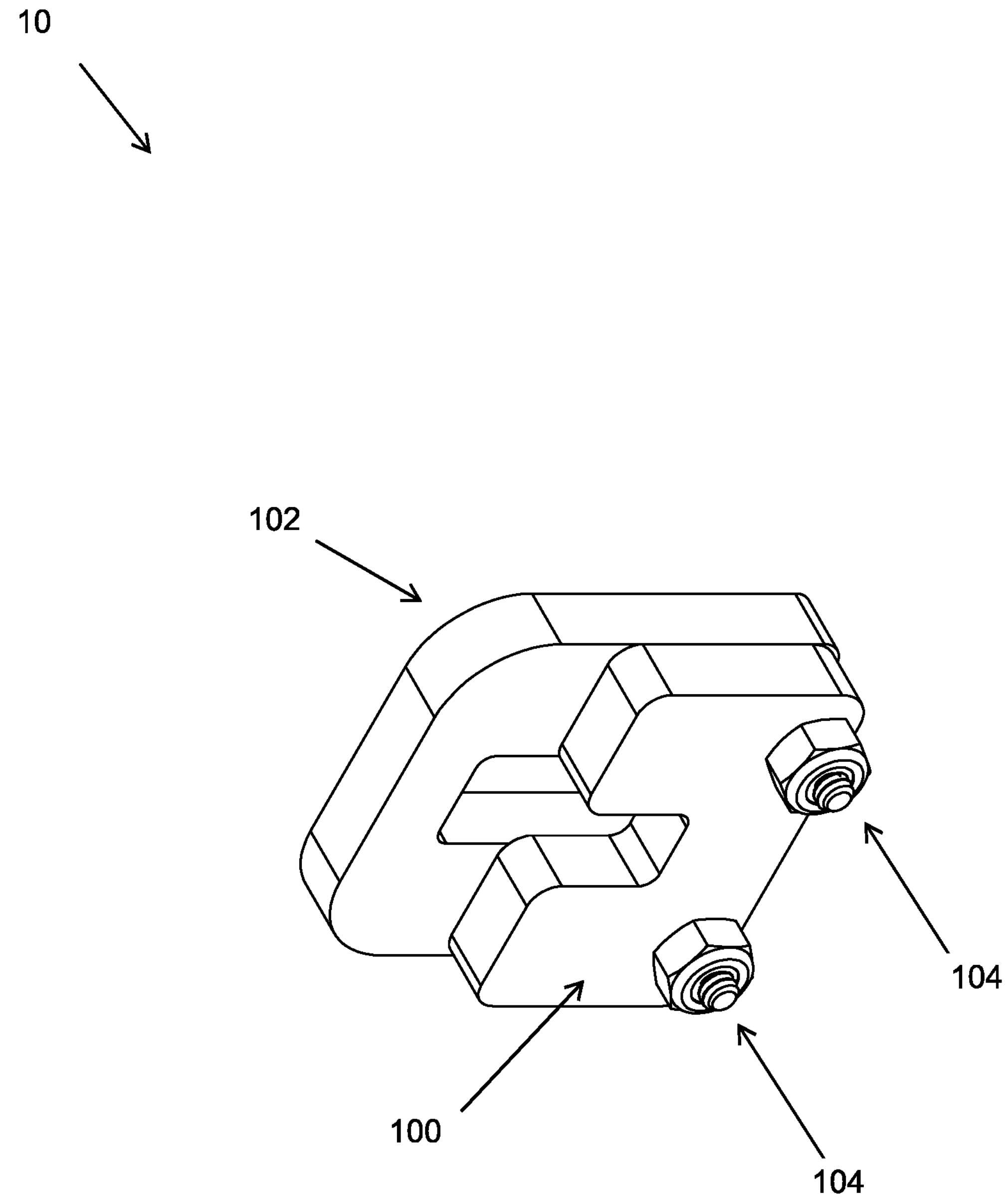
FIG. 2 shows an upper front left perspective view of a door stop system, in accordance with one or more embodiments of the present disclosure.
Figure 3:
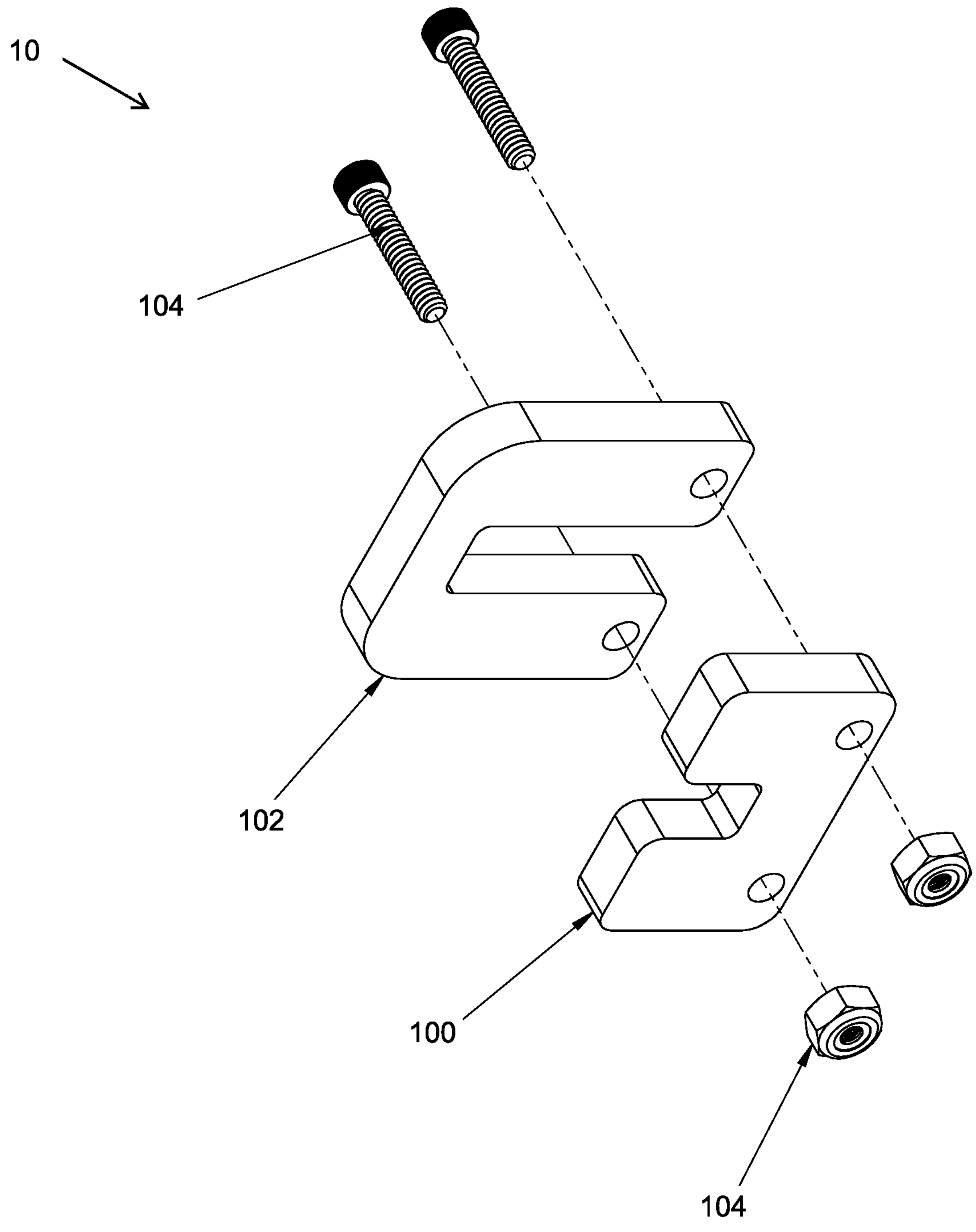
FIG. 3 shows an exploded upper front left perspective view of a door stop system, in accordance with one or more embodiments of the present disclosure.
Figure 4:
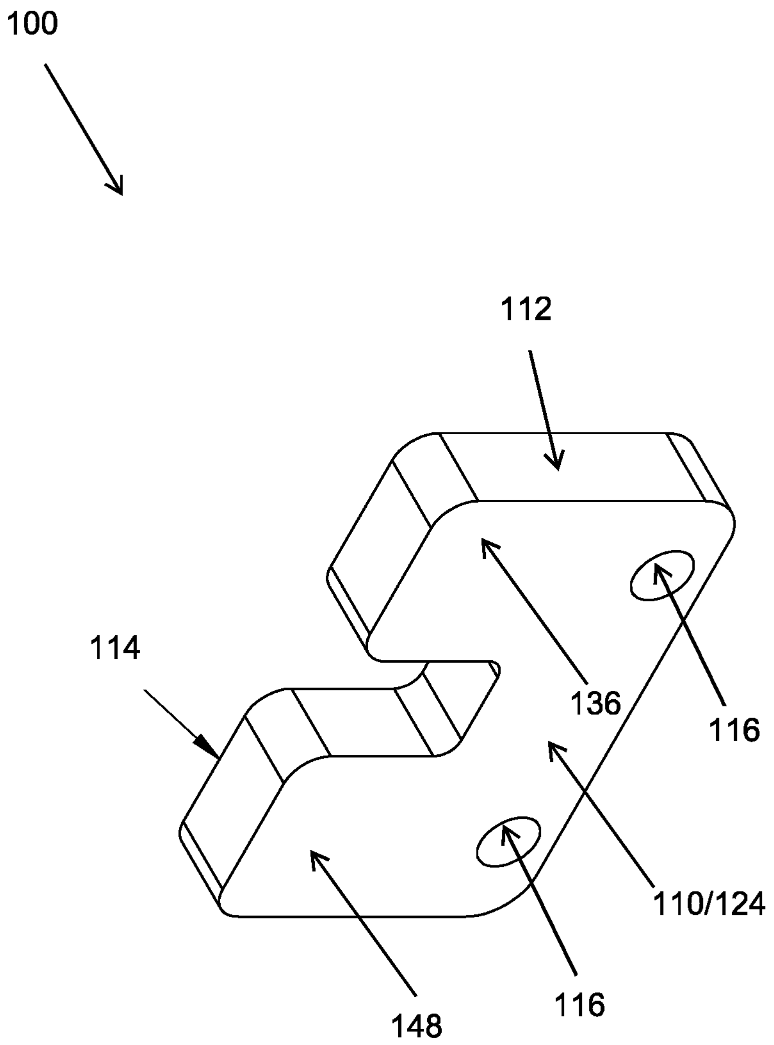
FIG. 4 shows an upper front left perspective view of a first stop component of a door stop system, in accordance with one or more embodiments of the present disclosure.
Figure 5:
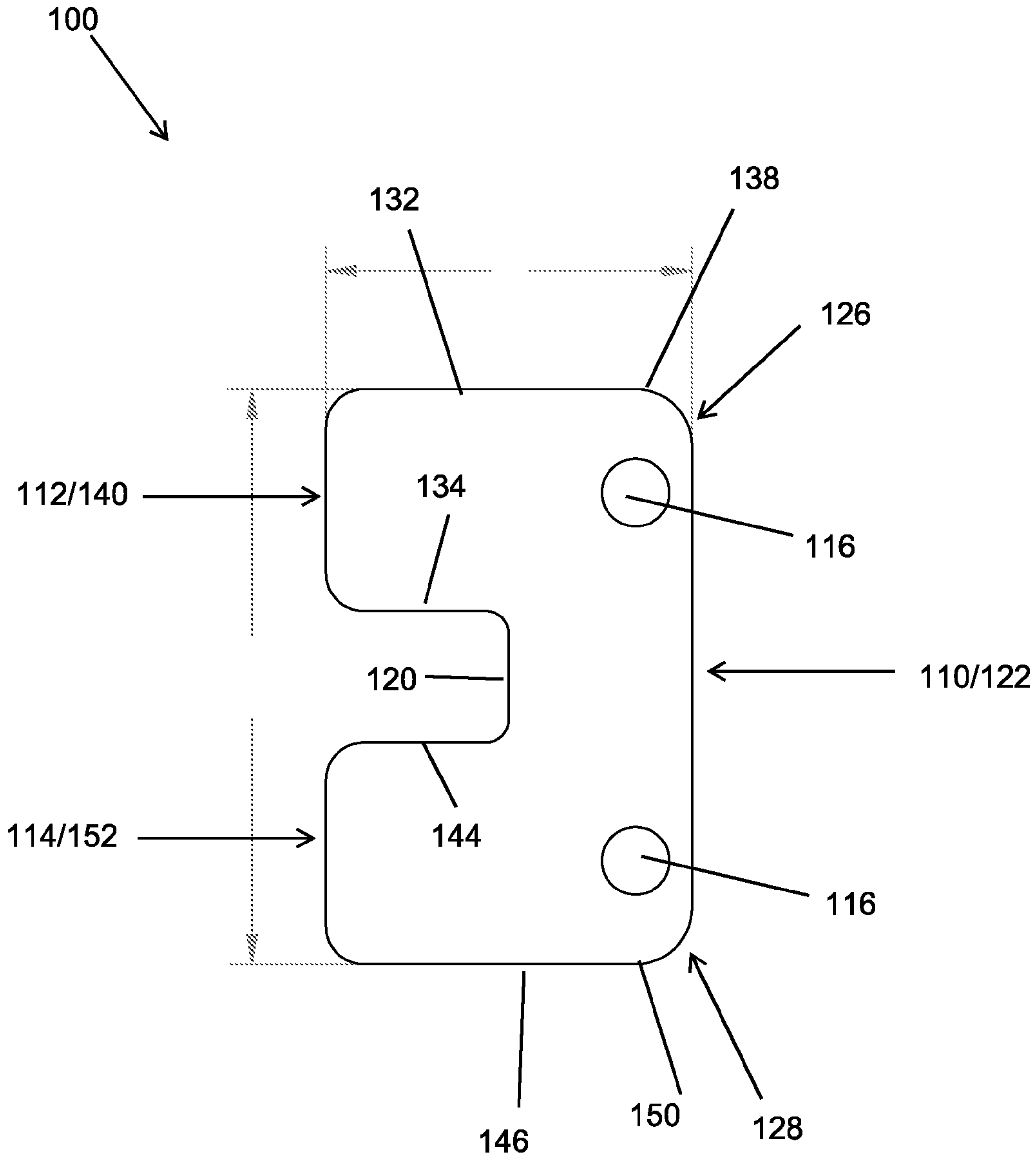
FIG. 5 shows a left view of a first stop component of a door stop system, in accordance with one or more embodiments of the present disclosure.
Figure 6:
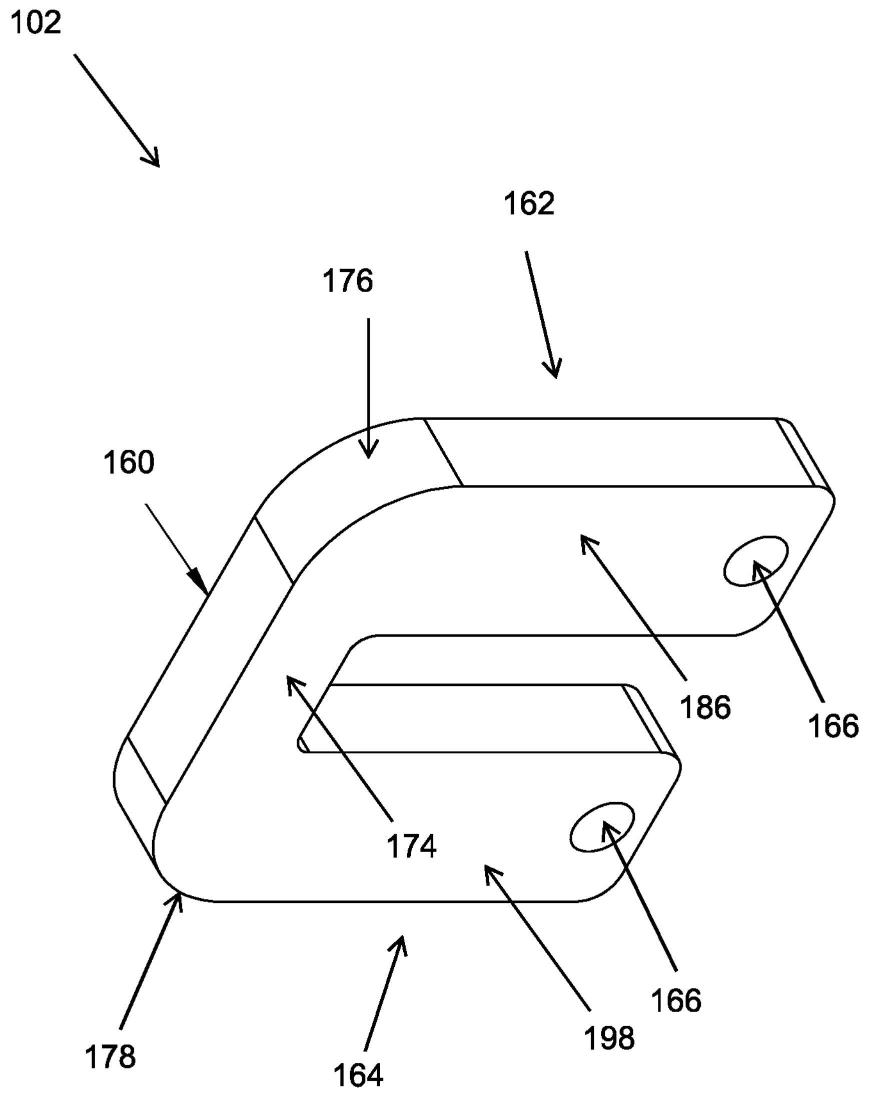
FIG. 6 shows an upper front left perspective view of a second stop component of a door stop system, in accordance with one or more embodiments of the present disclosure.
Figure 7:
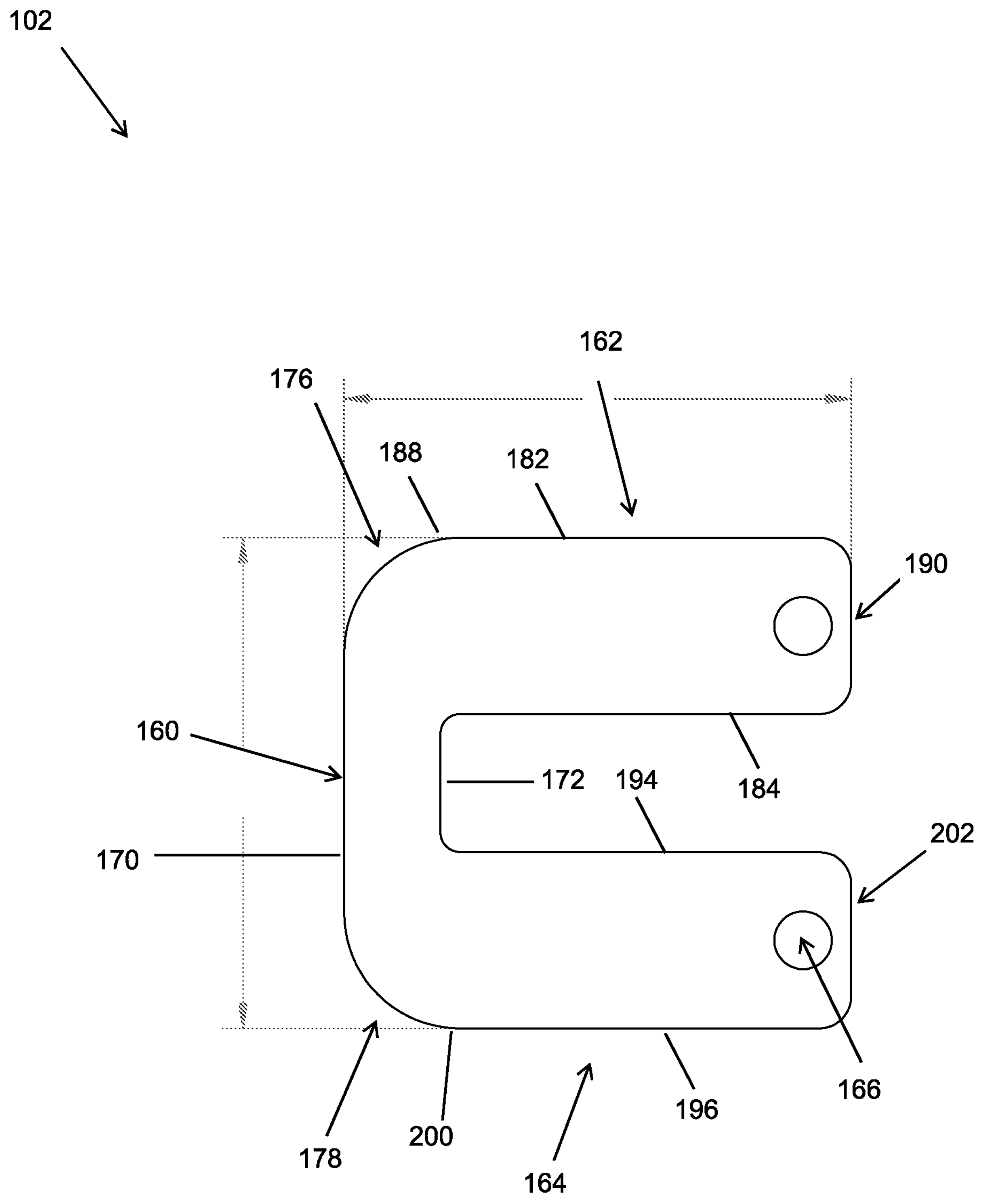
FIG. 7 shows a left view of a second stop component of a door stop system, in accordance with one or more embodiments of the present disclosure.
Figure 8:
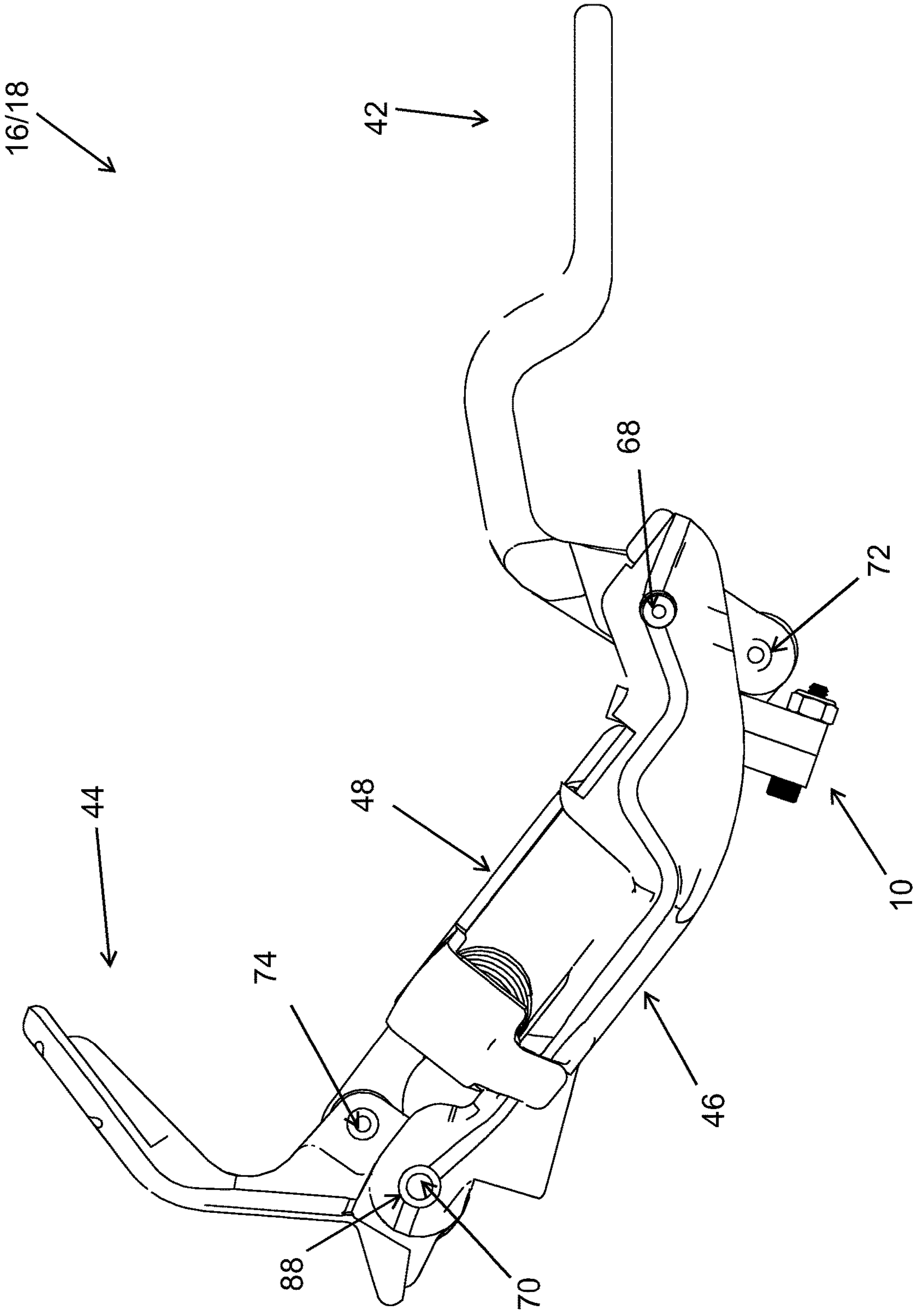
FIG. 8 shows a top view of a multi-axial hinge with door stop system installed, in accordance with one or more embodiments of the present disclosure; the view showing the multi-axial hinge in an open position.
Figure 9:
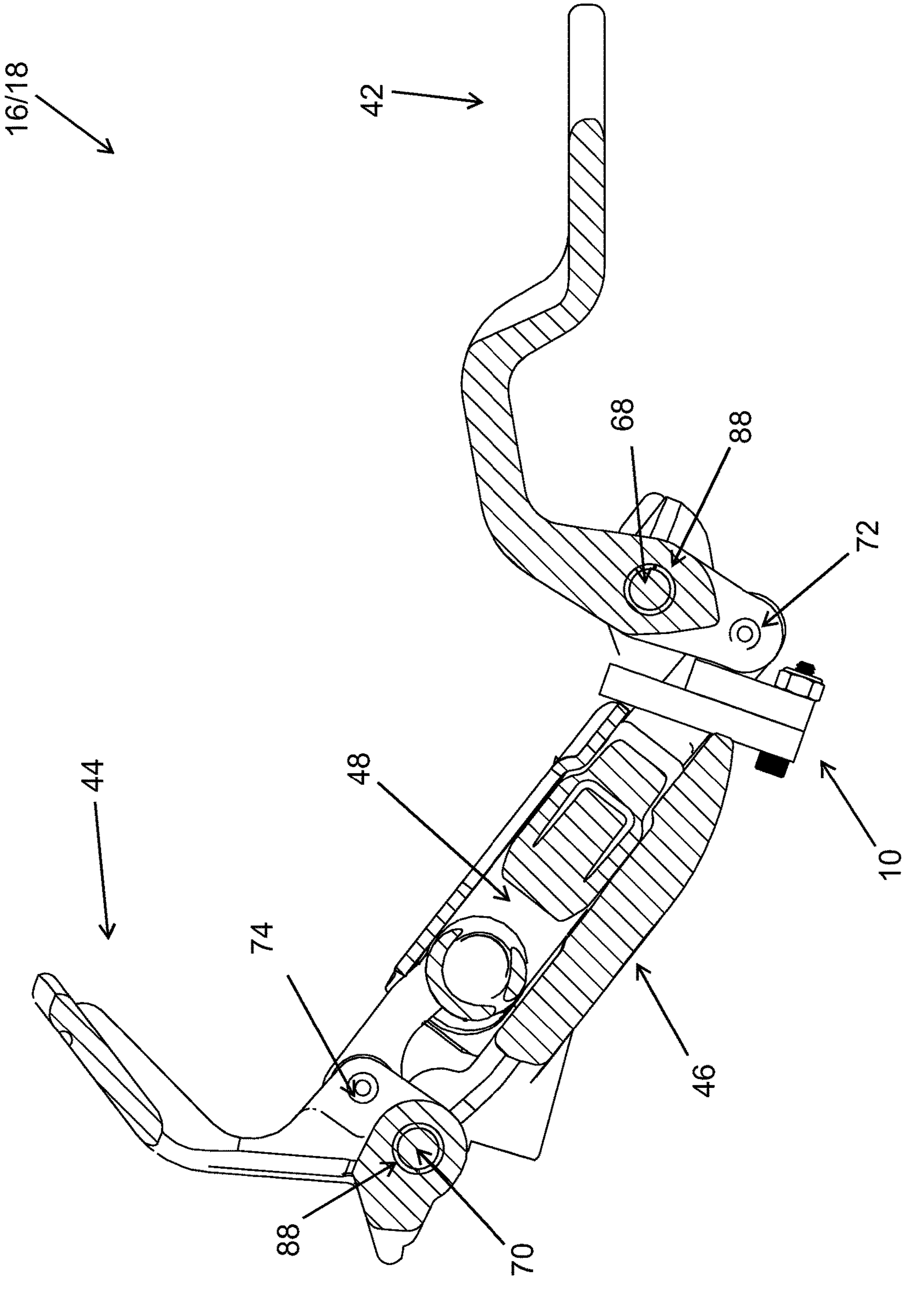
FIG. 9 shows a cross sectional top view of a door stop system and multi-axial hinge shown in FIG. 8, in accordance with one or more embodiments of the present disclosure.
Figure 10:
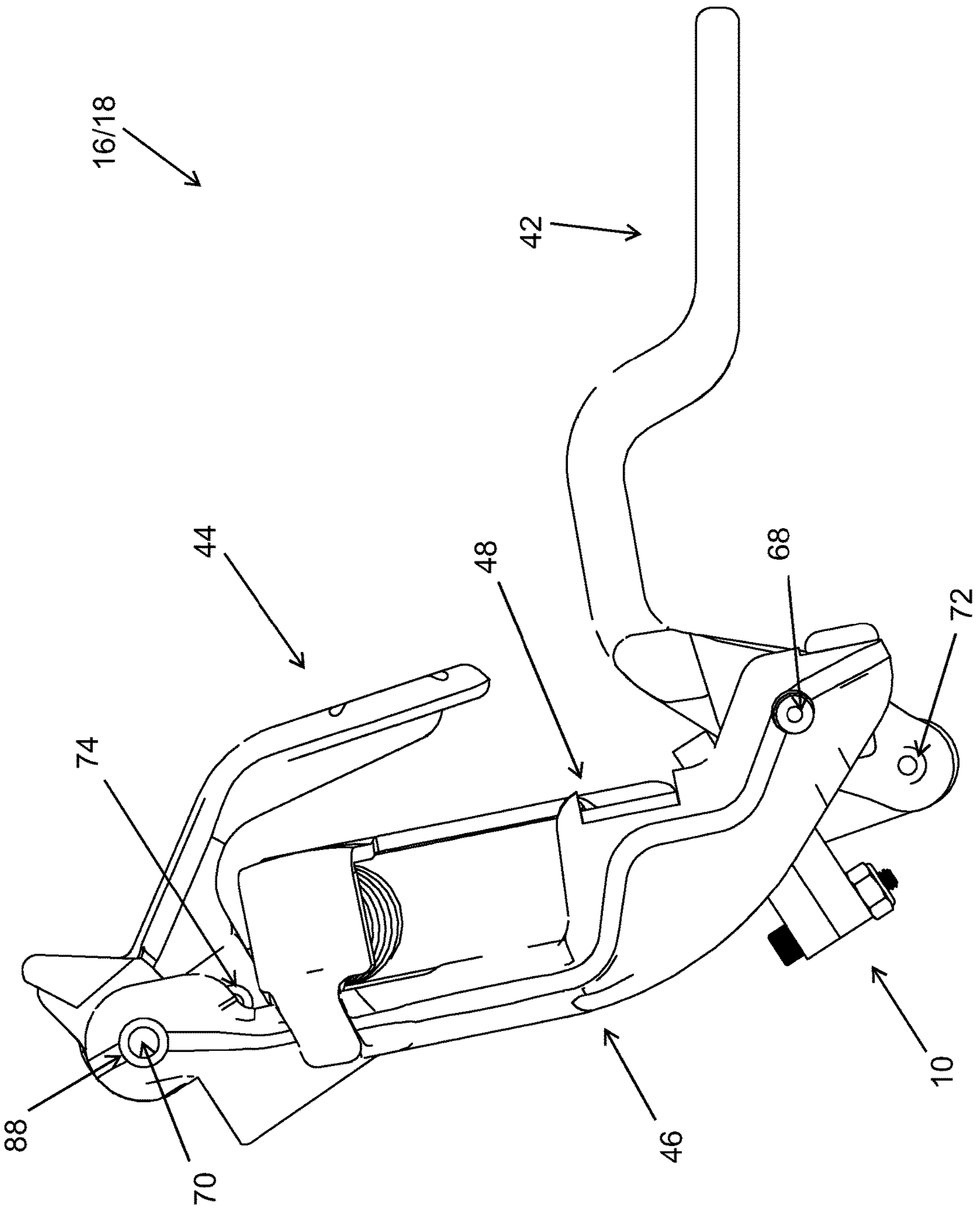
FIG. 10 shows a top view of a multi-axial hinge with door stop system installed, in accordance with one or more embodiments of the present disclosure; the view showing the multi-axial hinge in a closed position.
Figure 11:
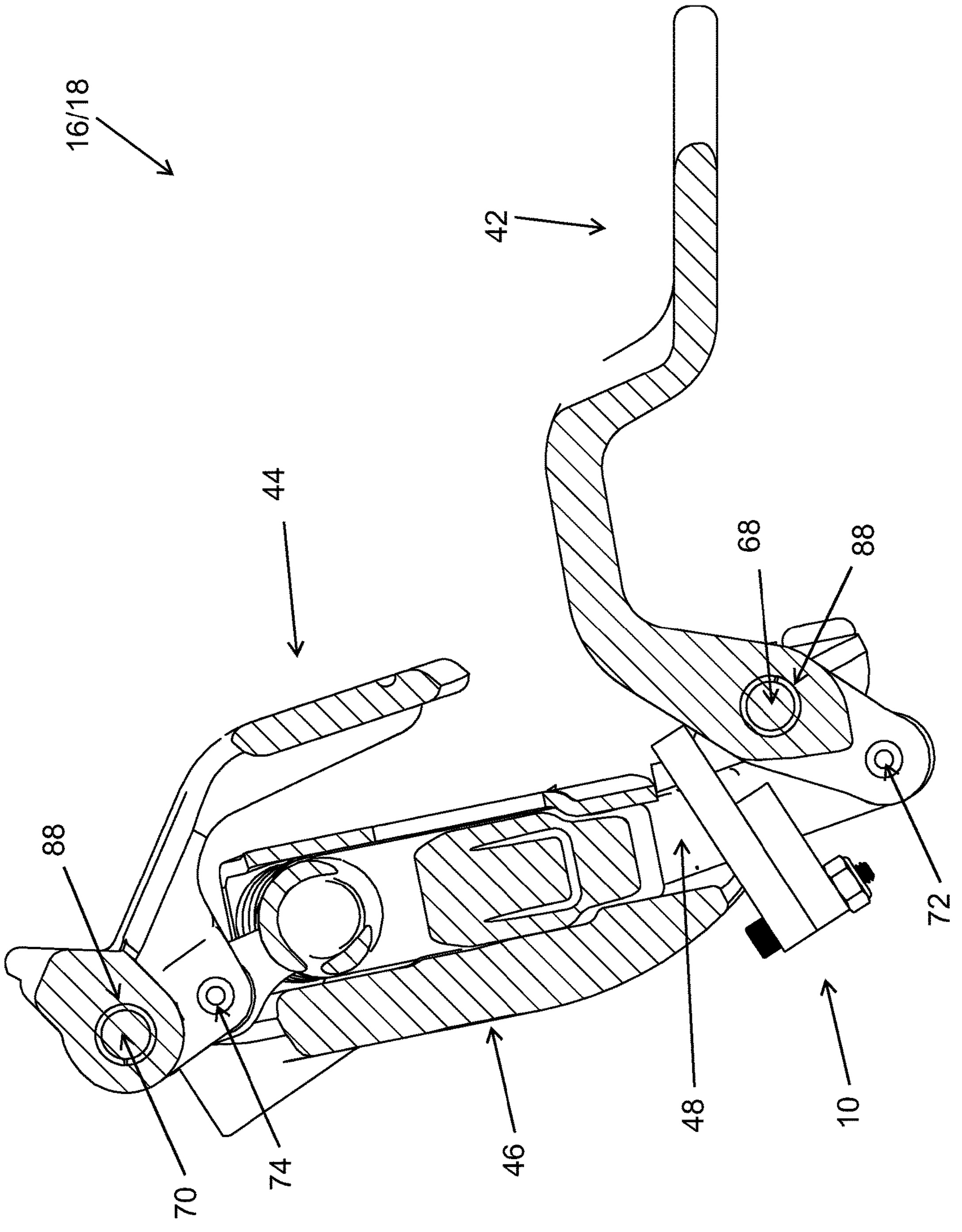
FIG. 11 shows a cross sectional top view of a door stop system and multi-axial hinge shown in FIG. 10, in accordance with one or more embodiments of the present disclosure.
Figure 12:
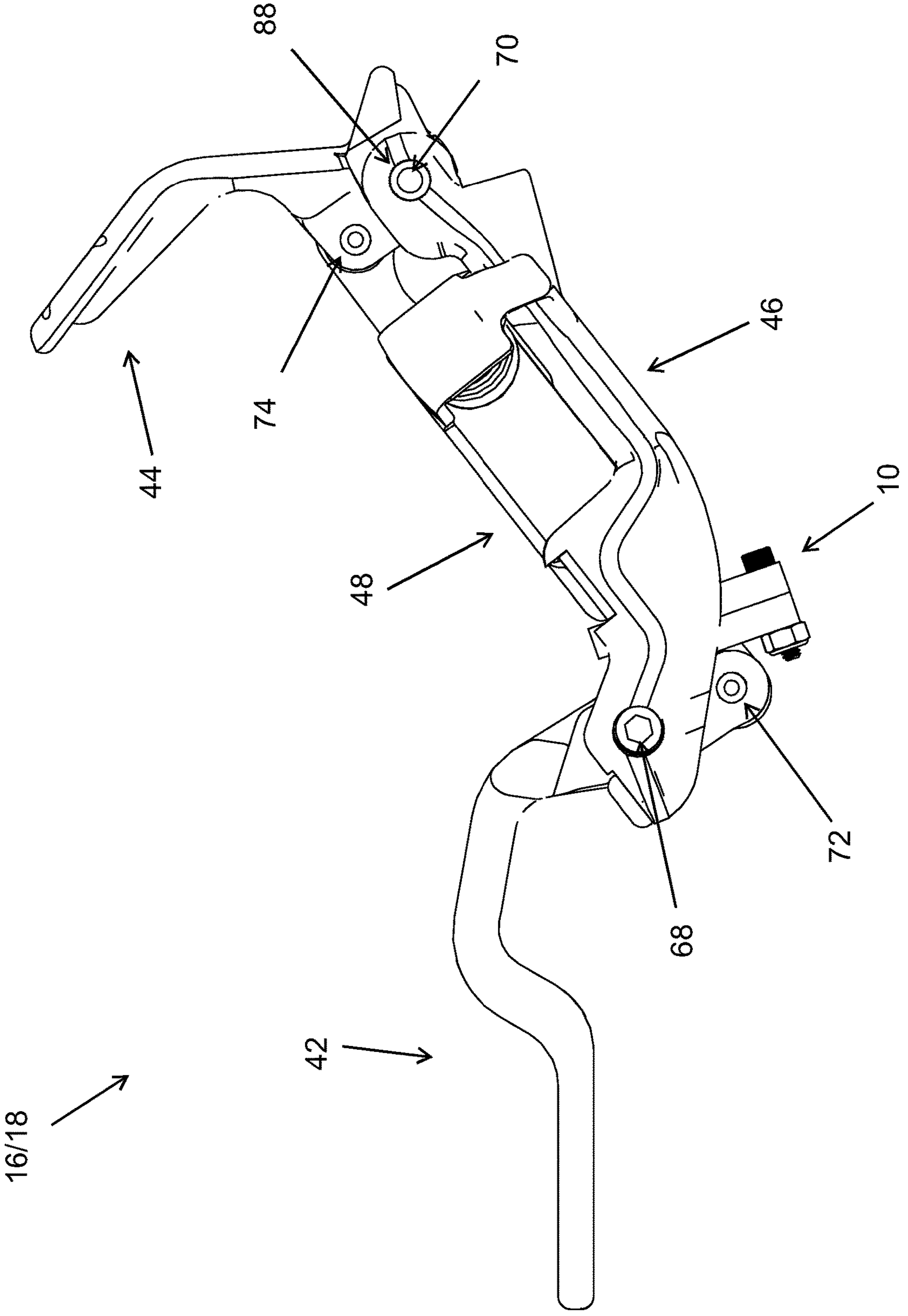
FIG. 12 shows a bottom view of a multi-axial hinge with door stop system installed, in accordance with one or more embodiments of the present disclosure; the view showing the multi-axial hinge in an open position.
Figure 13:
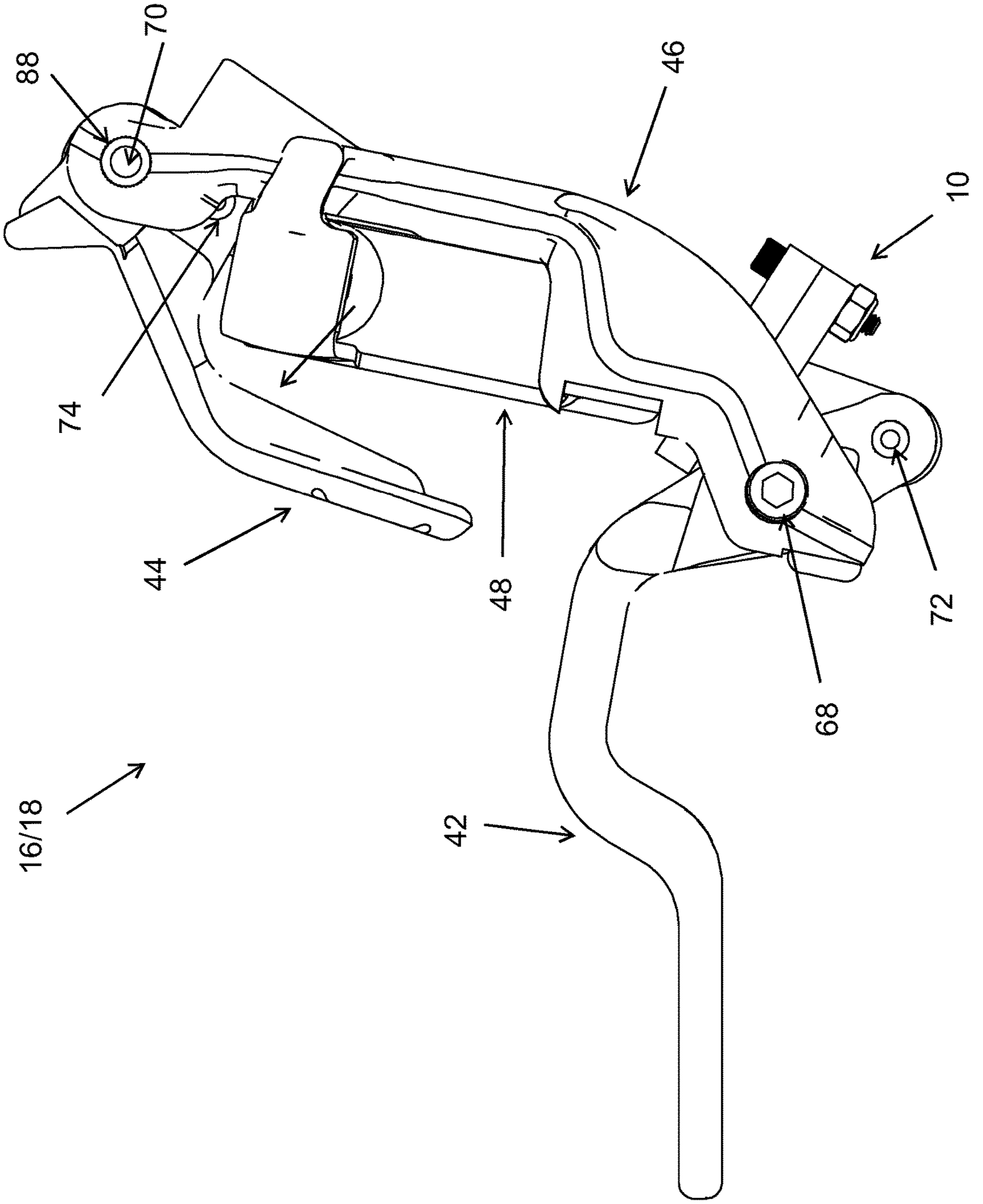
FIG. 13 shows a bottom view of a multi-axial hinge with door stop system installed e, in accordance with one or more embodiments of the present disclosure; the view showing the multi-axial hinge in a closed position.
Figure 14:
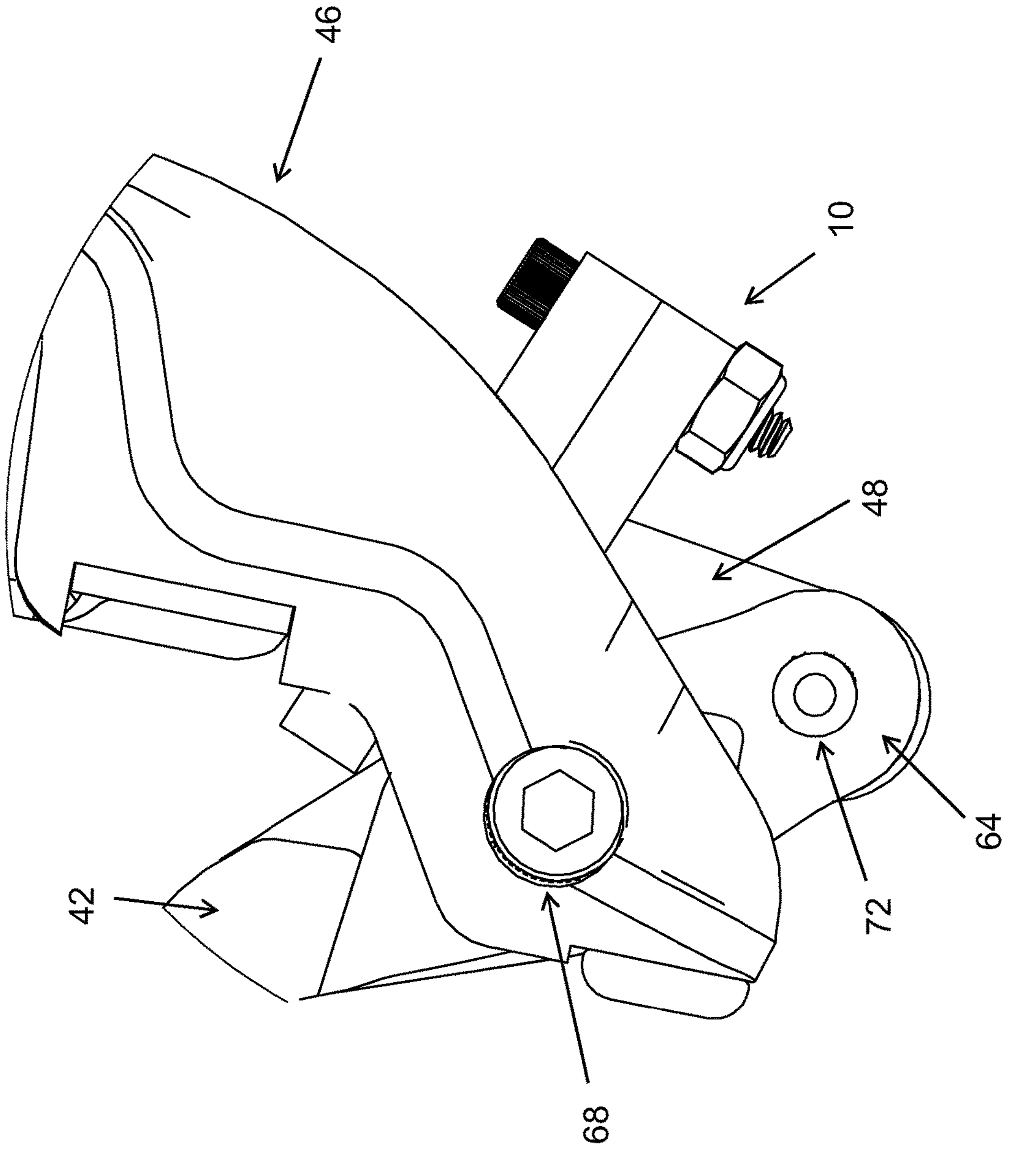
FIG. 14 show a close up view of the door stop system installed the multi-axial hinge shown in FIG. 13.
Figure 15:
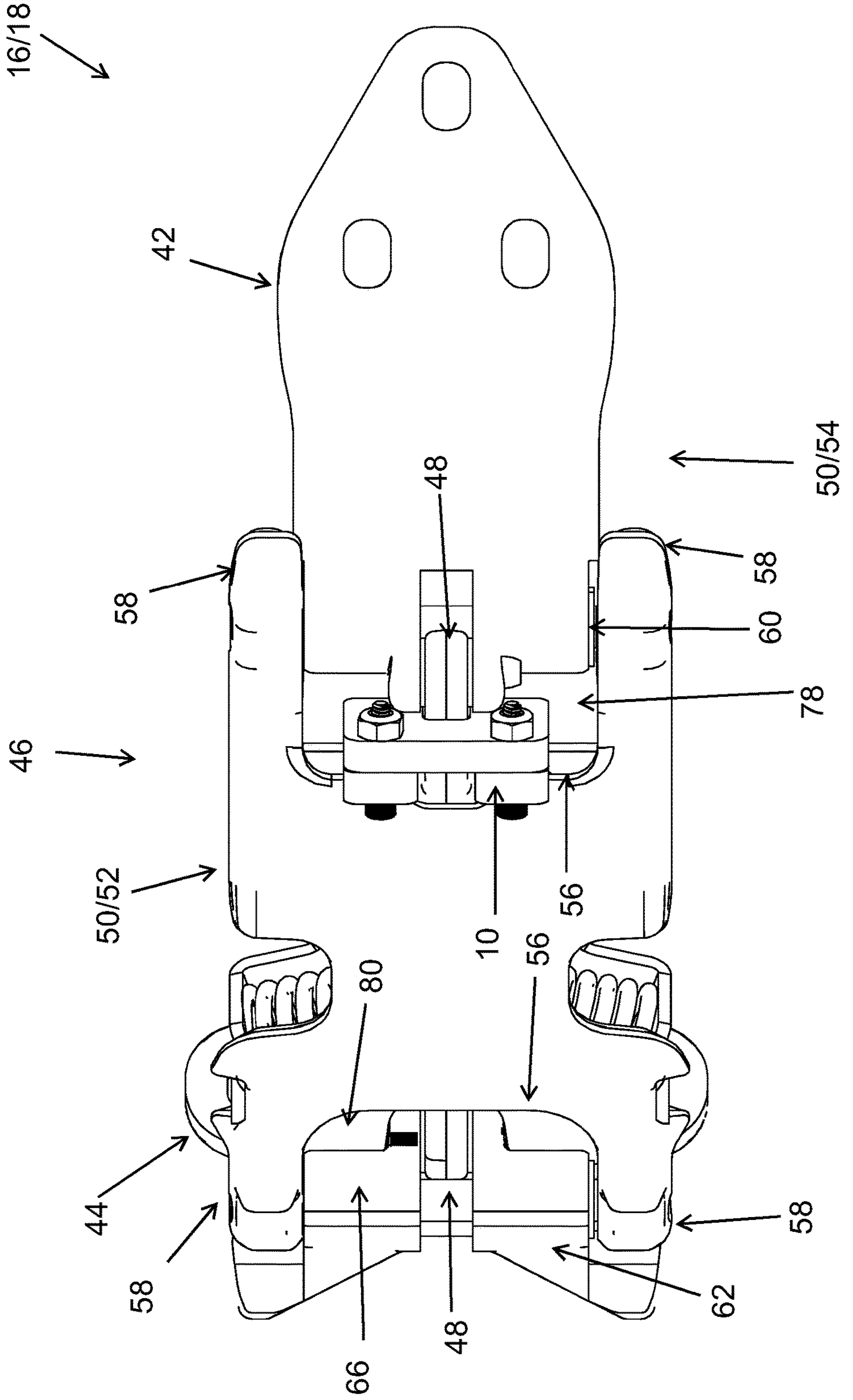
FIG. 15 shows a rear view of a multi-axial hinge with door stop system installed, in accordance with one or more embodiments of the present disclosure; the view showing the multi-axial hinge in an open position.
Figure 16:
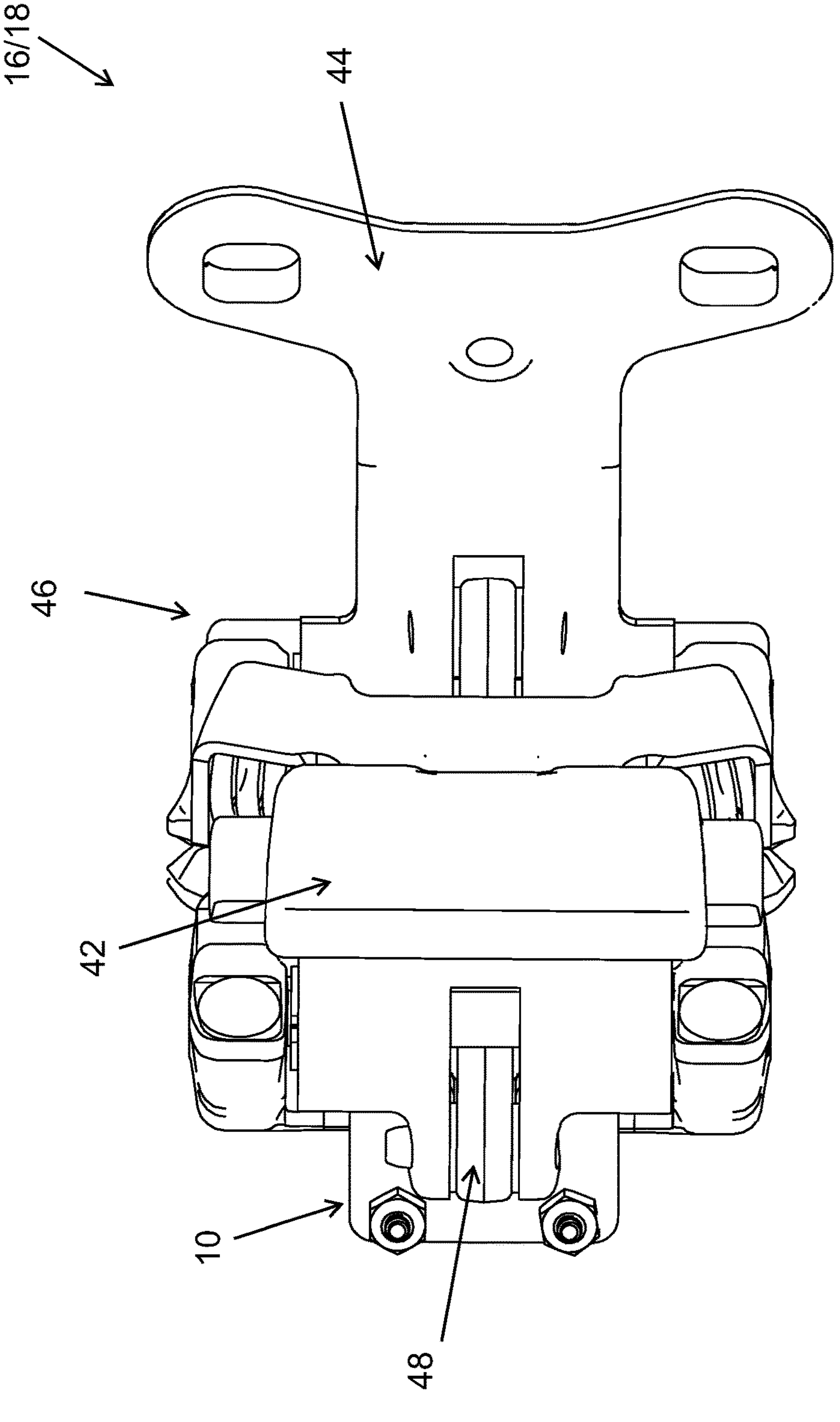
FIG. 16 shows a rearward vehicle side view of a multi-axial hinge with door stop system installed, in accordance with one or more embodiments of the present disclosure; the view showing the multi-axial hinge in an open position.
Figure 17:
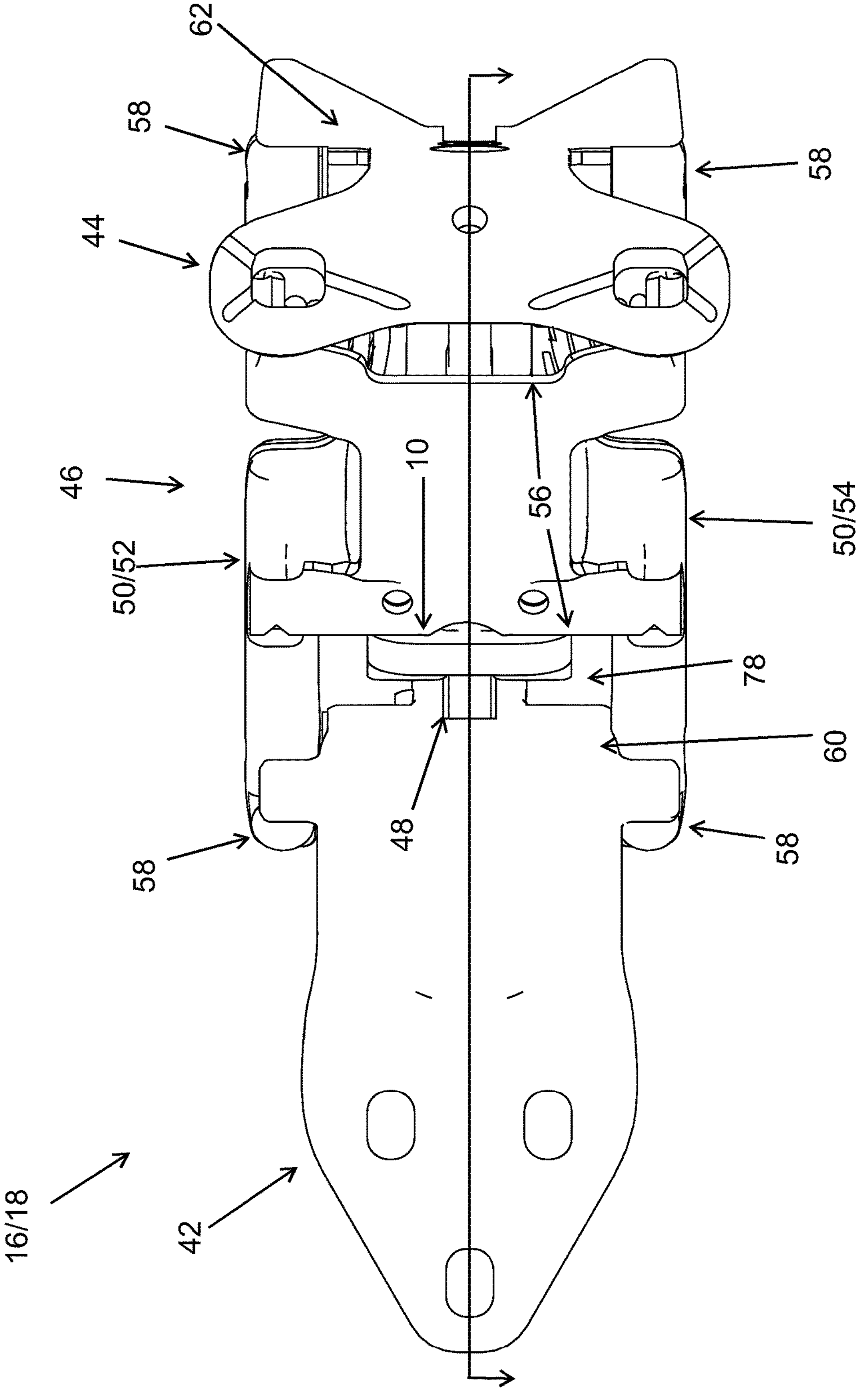
FIG. 17 shows a front side view of a multi-axial hinge with door stop system installed, in accordance with one or more embodiments of the present disclosure; the view showing the multi-axial hinge in an open position.
Figure 18:
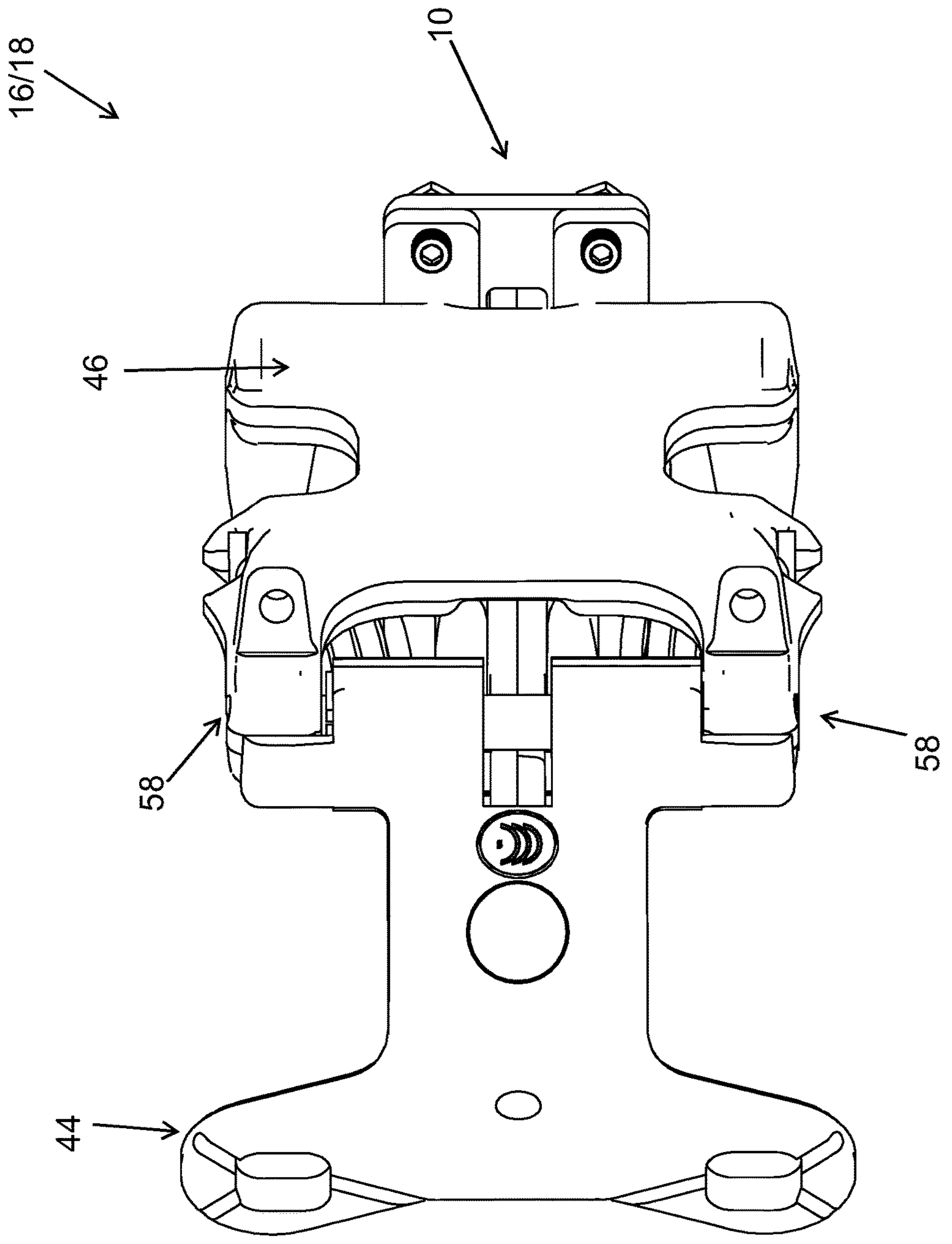
FIG. 18 shows a rearward door side view of a multi-axial hinge with door stop system installed, in accordance with one or more embodiments of the present disclosure; the view showing the multi-axial hinge in an open position.
Figure 19:
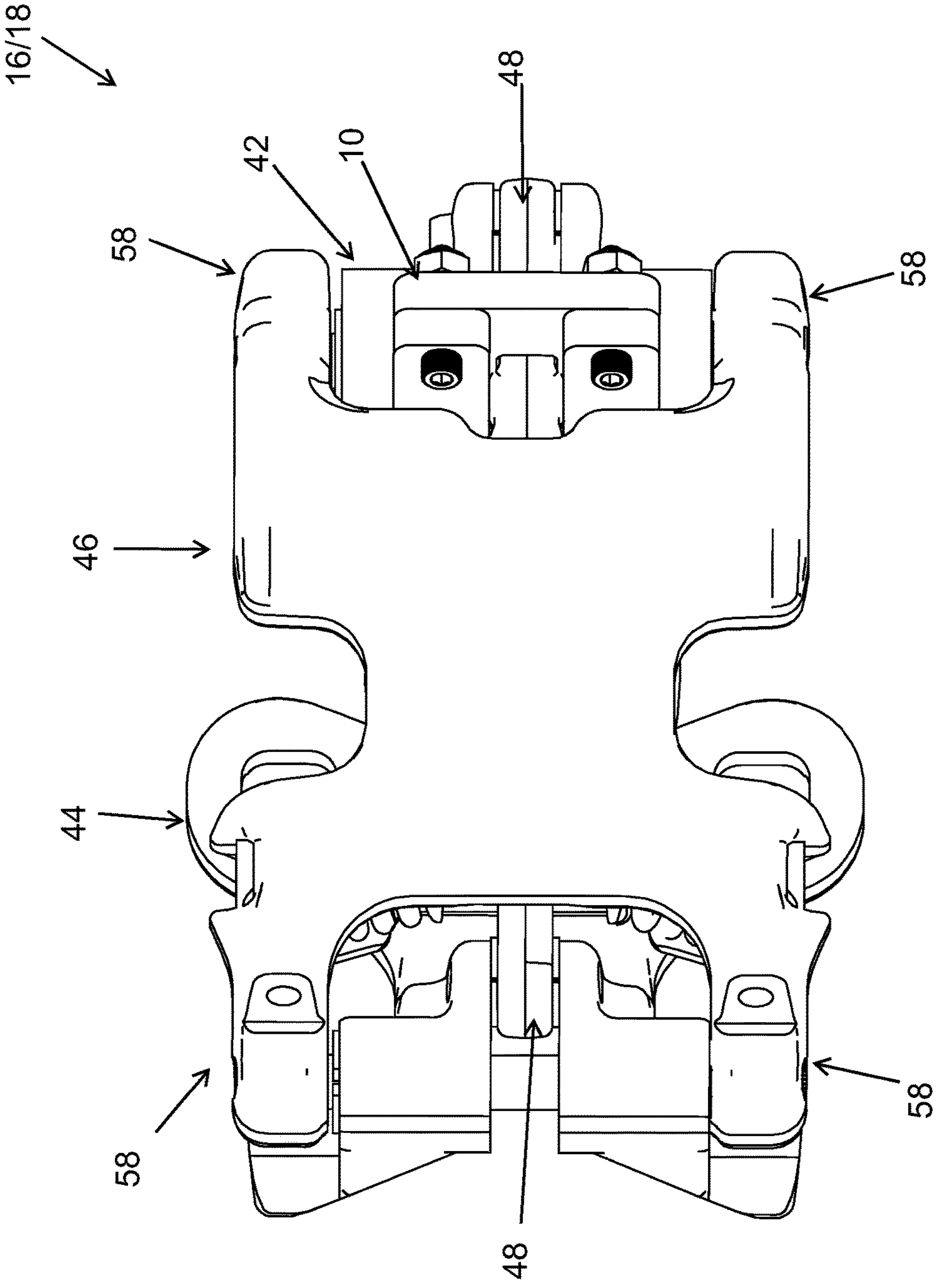
FIG. 19 shows a rear view of a multi-axial hinge with door stop system installed, in accordance with one or more embodiments of the present disclosure; the view showing the multi-axial hinge in a closed position.
Figure 20:
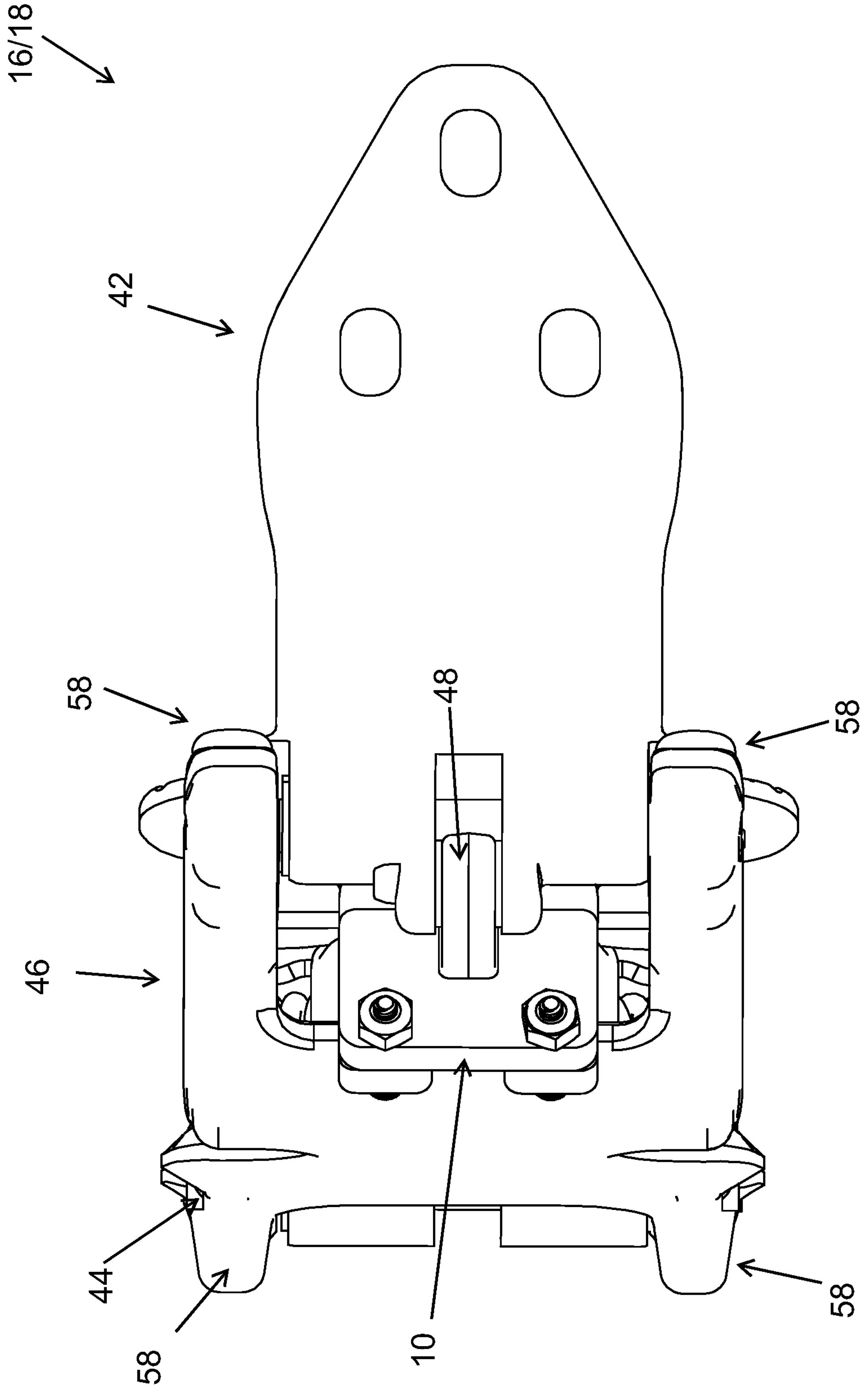
FIG. 20 shows a rearward vehicle side view of a multi-axial hinge with door stop system installed, in accordance with one or more embodiments of the present disclosure; the view showing the multi-axial hinge in a closed position.
Figure 21:
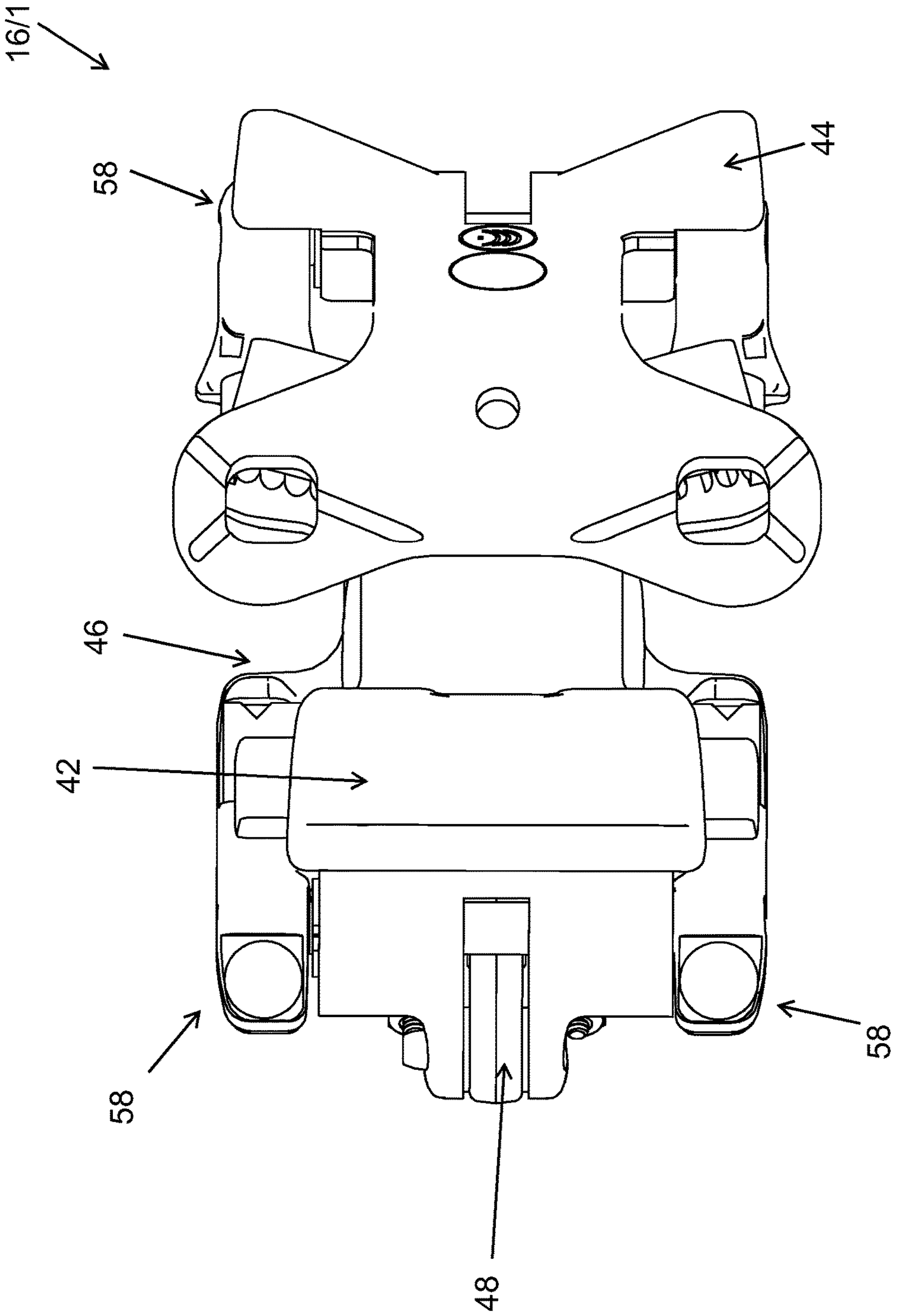
FIG. 21 shows a front side view of a multi-axial hinge with door stop system installed, in accordance with one or more embodiments of the present disclosure; the view showing the multi-axial hinge in a closed position.
Figure 22:
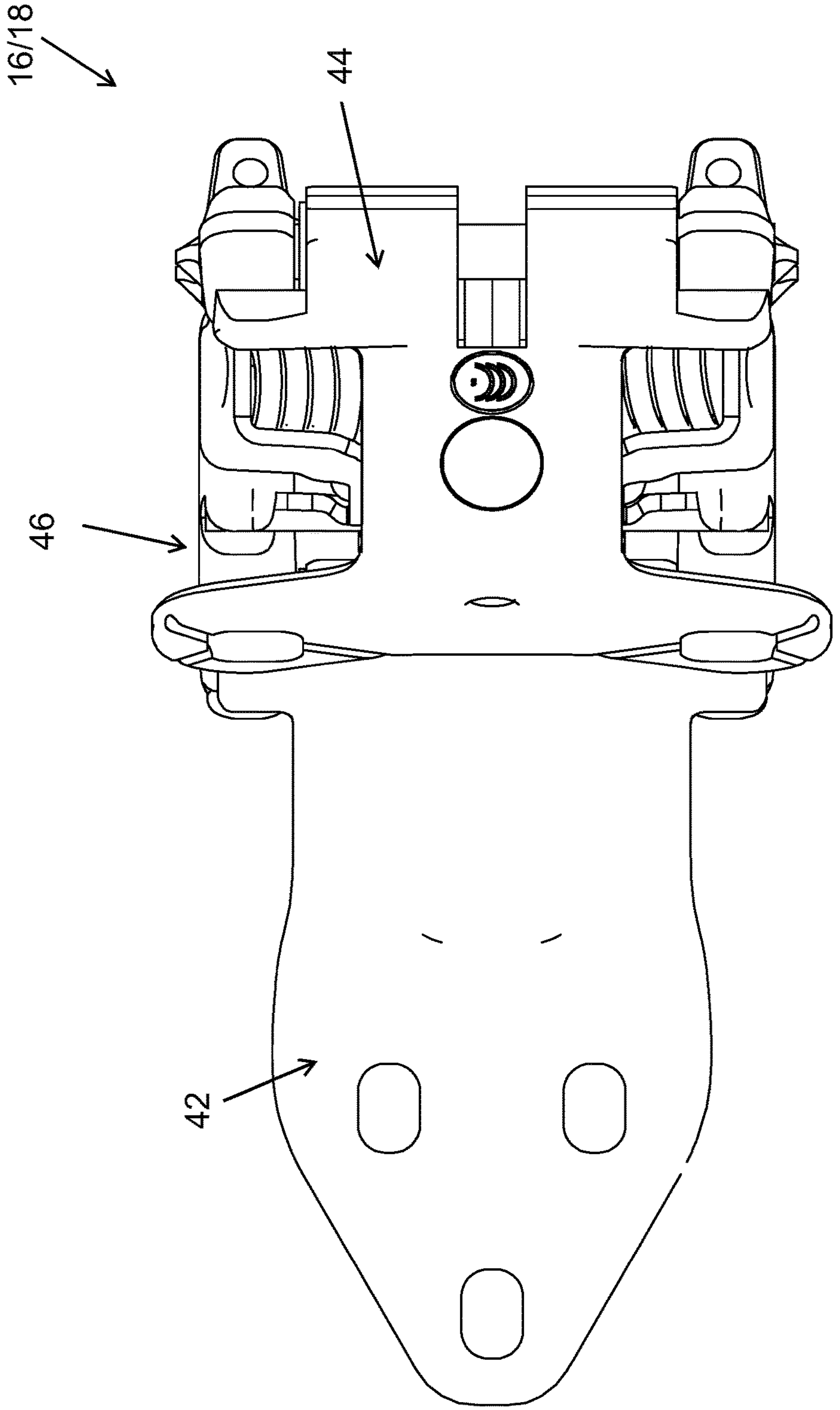
FIG. 22 shows a forward door side view of a multi-axial hinge with door stop system installed, in accordance with one or more embodiments of the present disclosure; the view showing the multi-axial hinge in a closed position.
Figure 23:
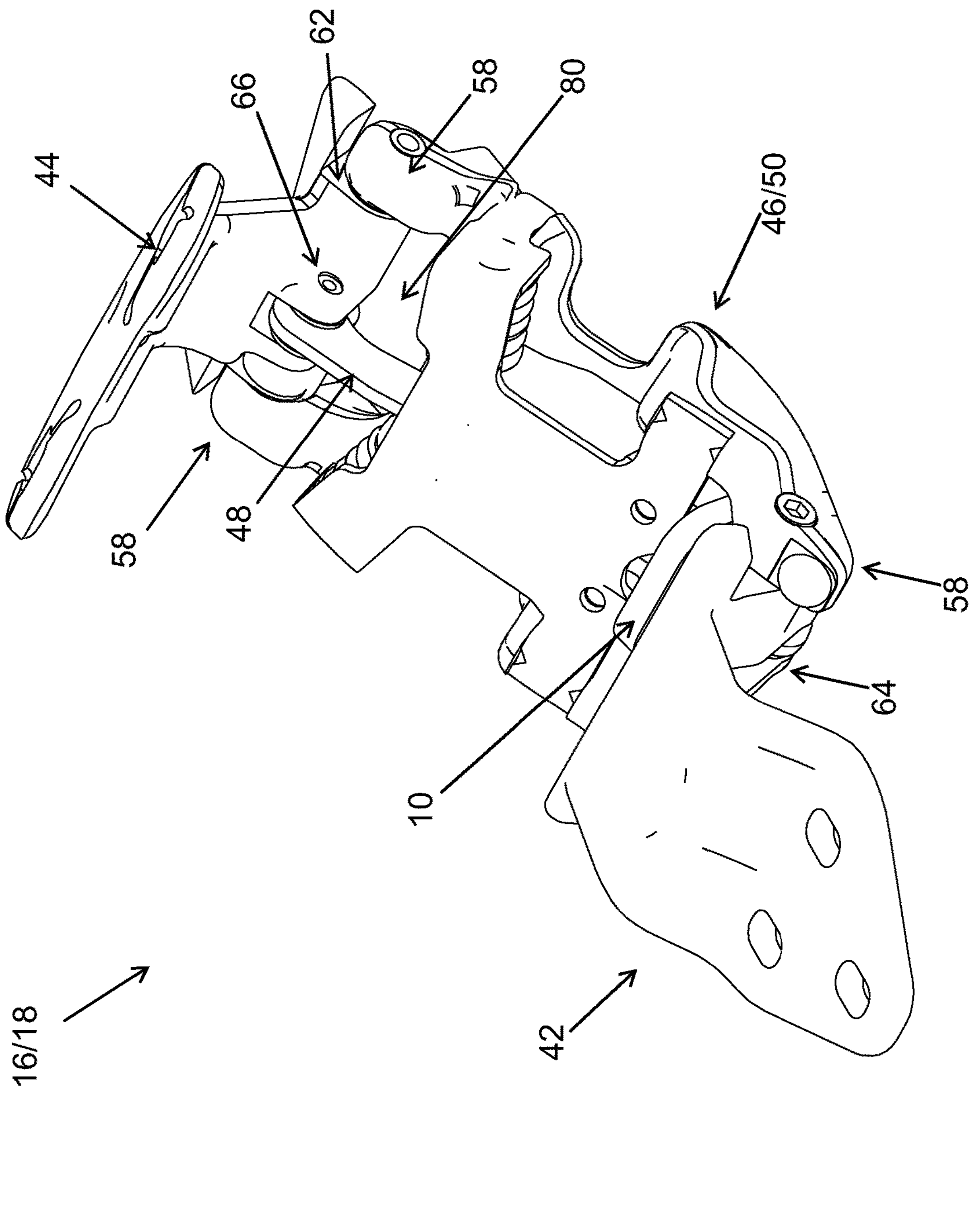
FIG. 23 shows a lower forward door side perspective view of a multi-axial hinge with door stop system installed, in accordance with one or more embodiments of the present disclosure; the view showing the multi-axial hinge in an open position.
Figure 24:
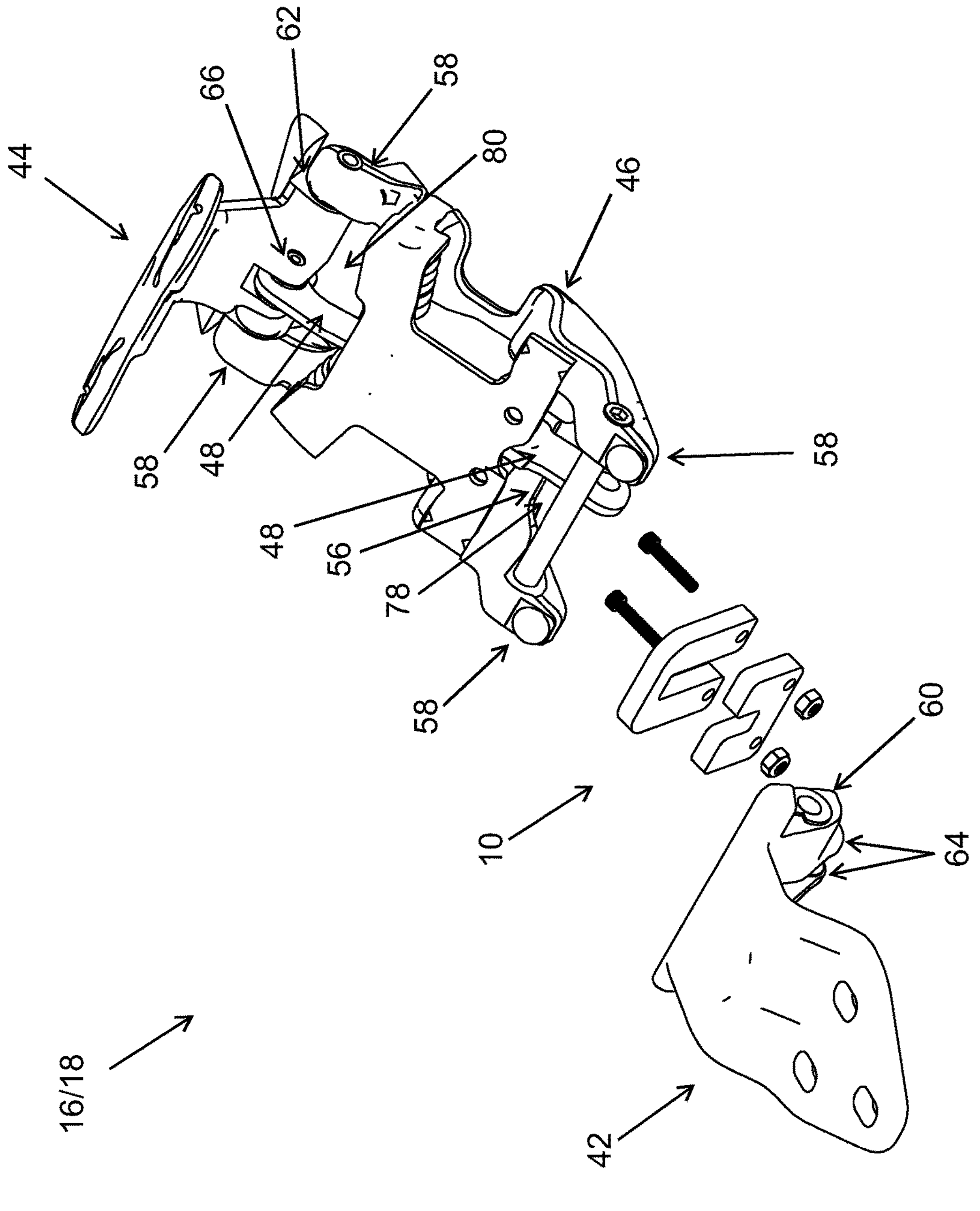
FIG. 24 shows a partially exploded lower forward door side perspective view of a multi-axial hinge with door stop system installed, in accordance with one or more embodiments of the present disclosure; the view showing the multi-axial hinge in an open position.
Figure 25:
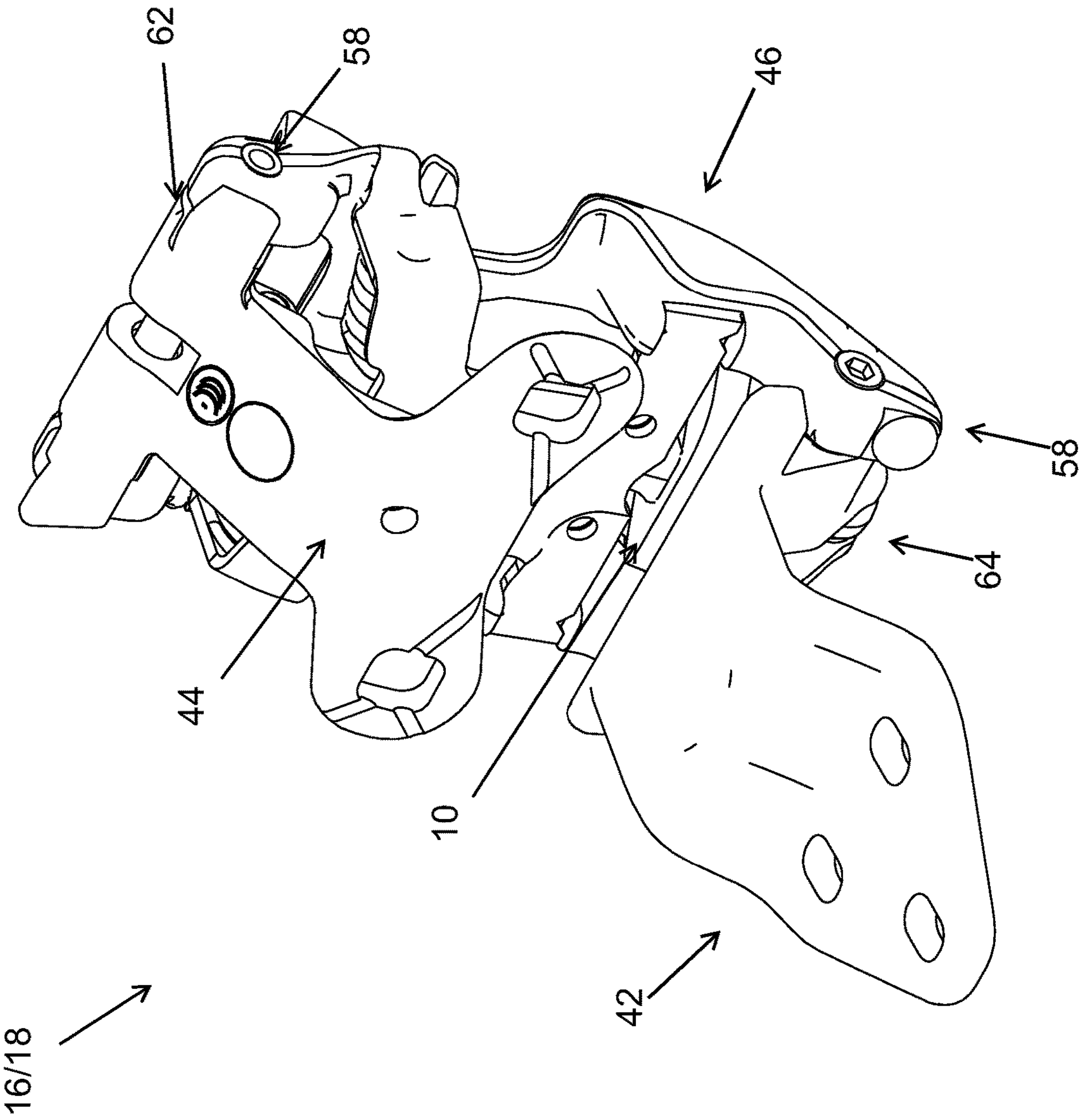
FIG. 25 shows a lower forward door side perspective view of a multi-axial hinge with door stop system installed, in accordance with one or more embodiments of the present disclosure; the view showing the multi-axial hinge in a close position.
Figure 26:
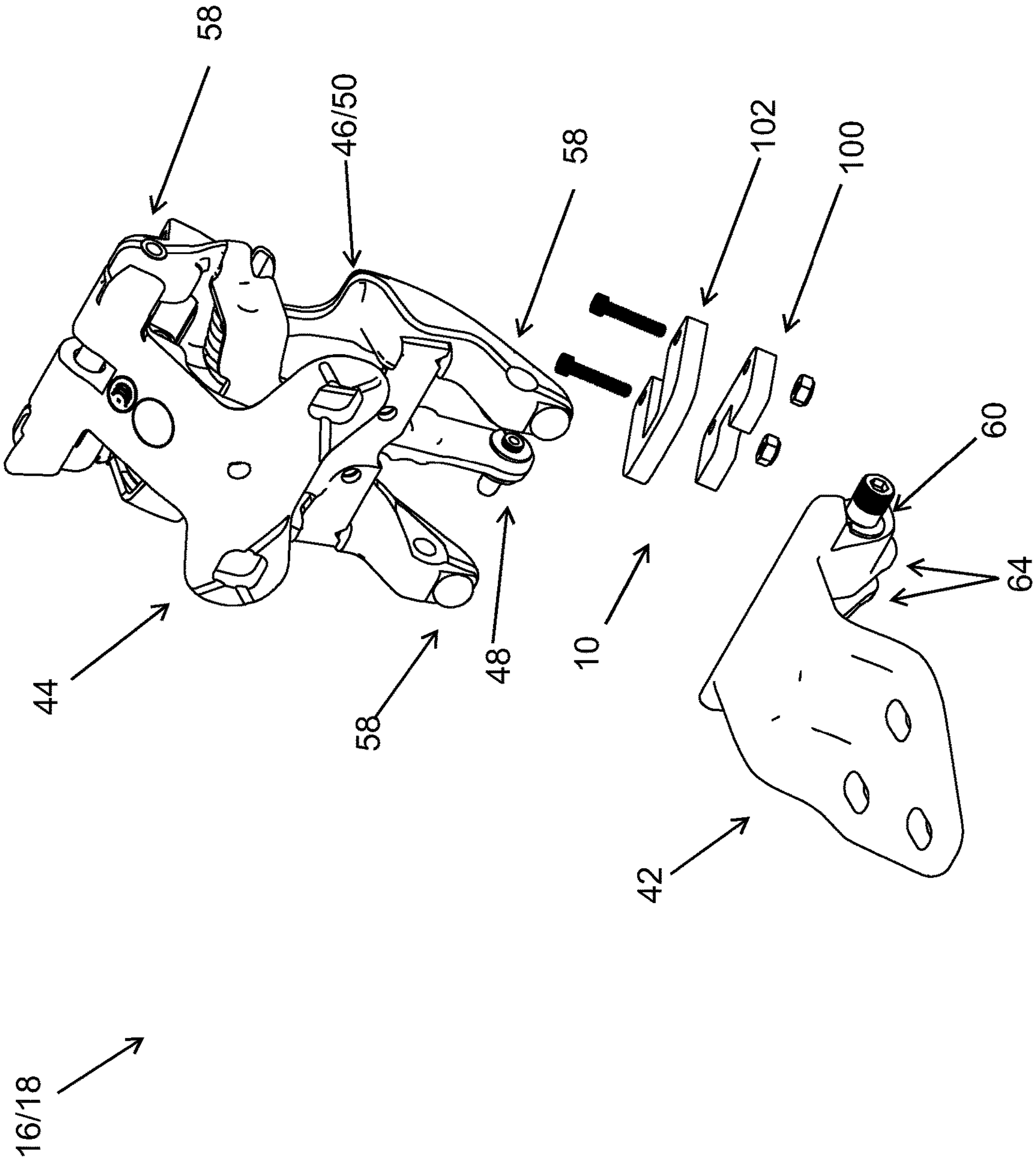
FIG. 26 shows a partially exploded lower forward door side perspective view of a multi-axial hinge with door stop system installed, in accordance with one or more embodiments of the present disclosure; the view showing the multi-axial hinge in a closed position.
Figure 27:
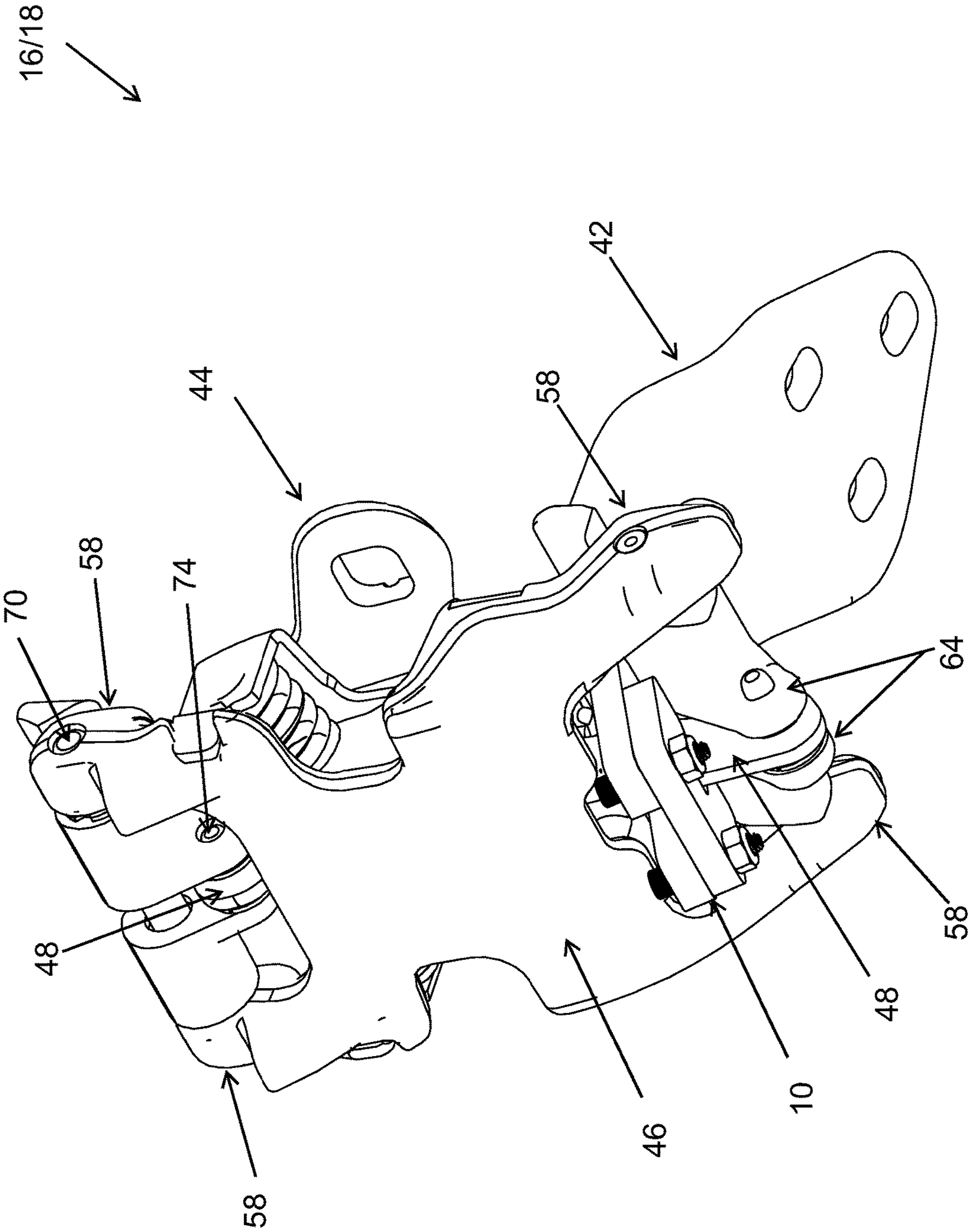
FIG. 27 shows an upper rearward door side perspective view of a multi-axial hinge with door stop system installed, in accordance with one or more embodiments of the present disclosure; the view showing the multi-axial hinge in a close position.
Figure 28:
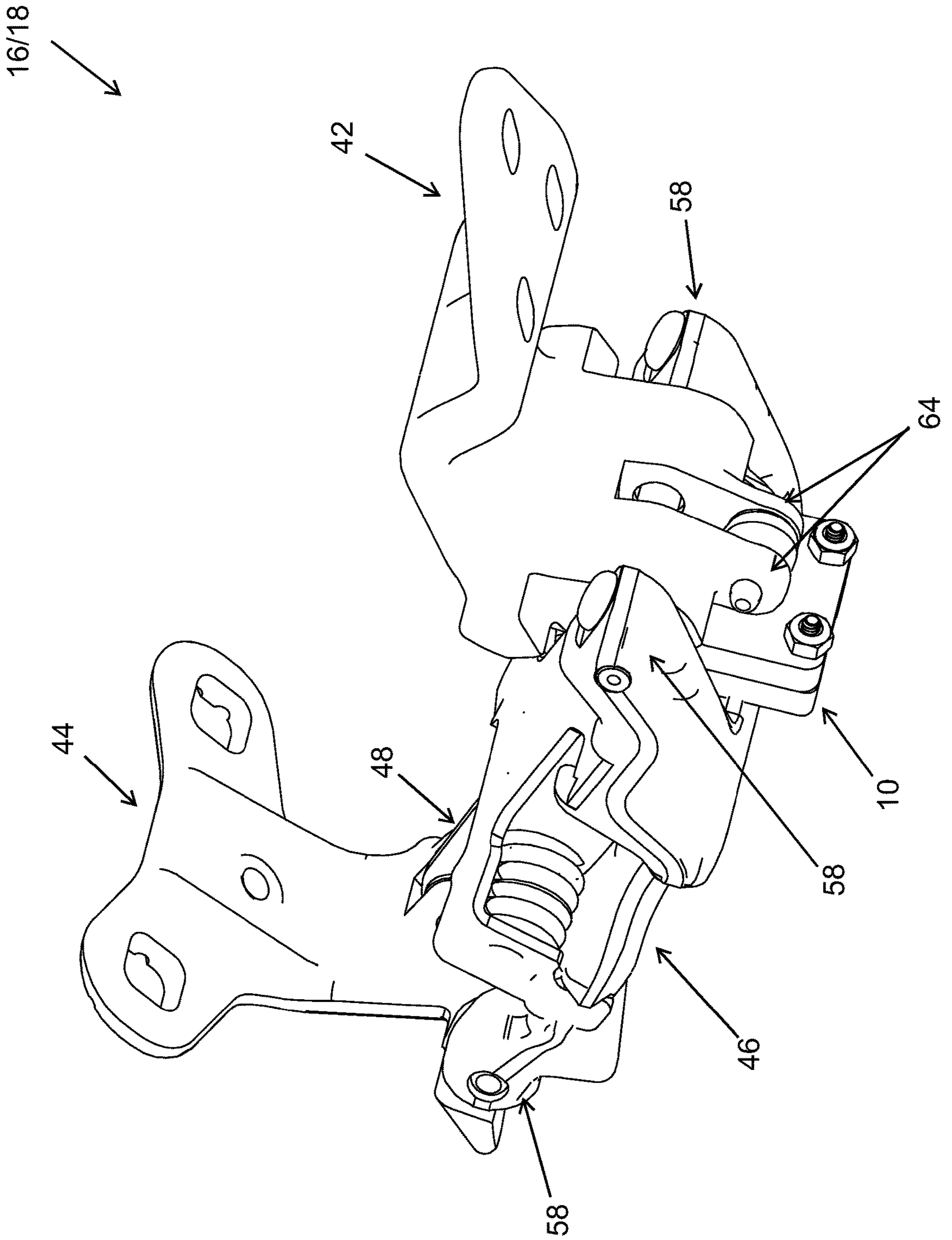
FIG. 28 shows an upper door side perspective view of a multi-axial hinge with door stop system installed, in accordance with one or more embodiments of the present disclosure; the view showing the multi-axial hinge in a close position.
Figure 29:
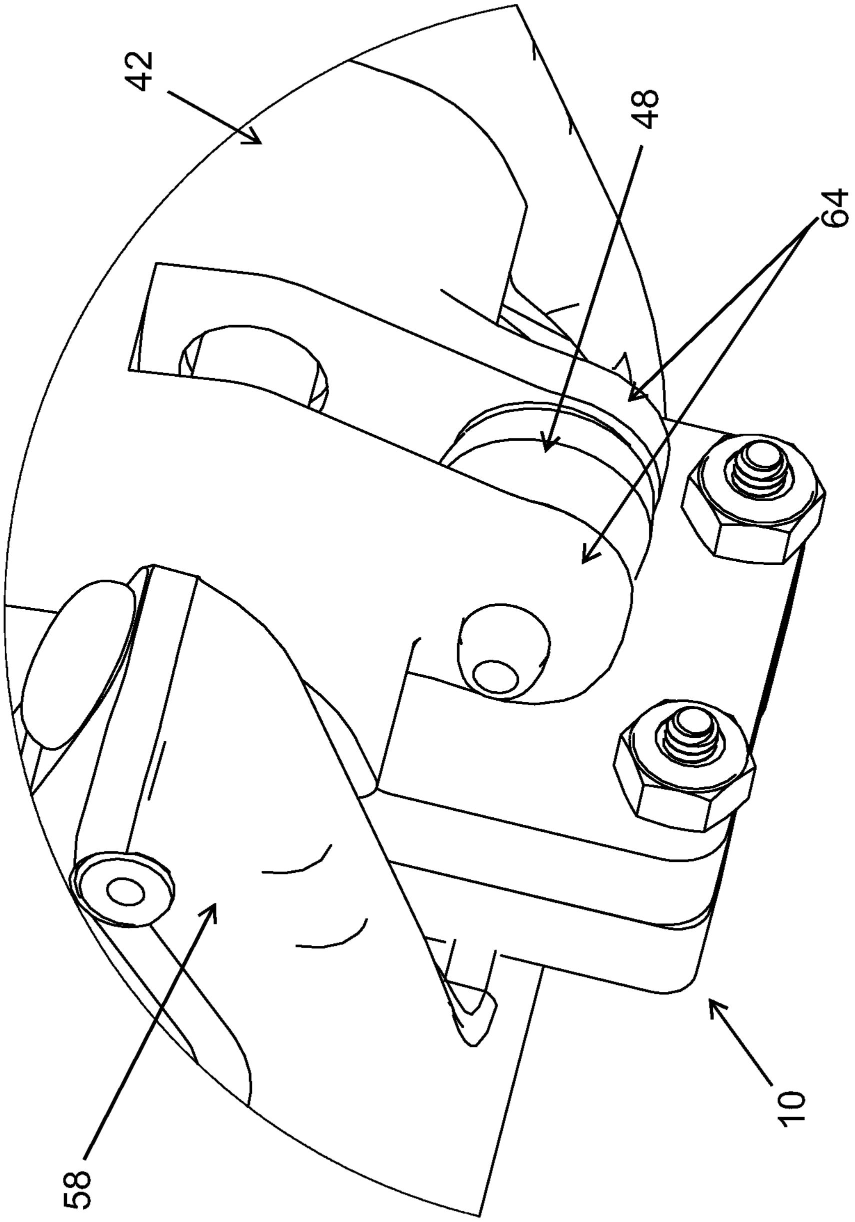
FIG. 29 show a close up view of the door stop system installed the multi-axial hinge shown in FIG. 28.
Figure 30:
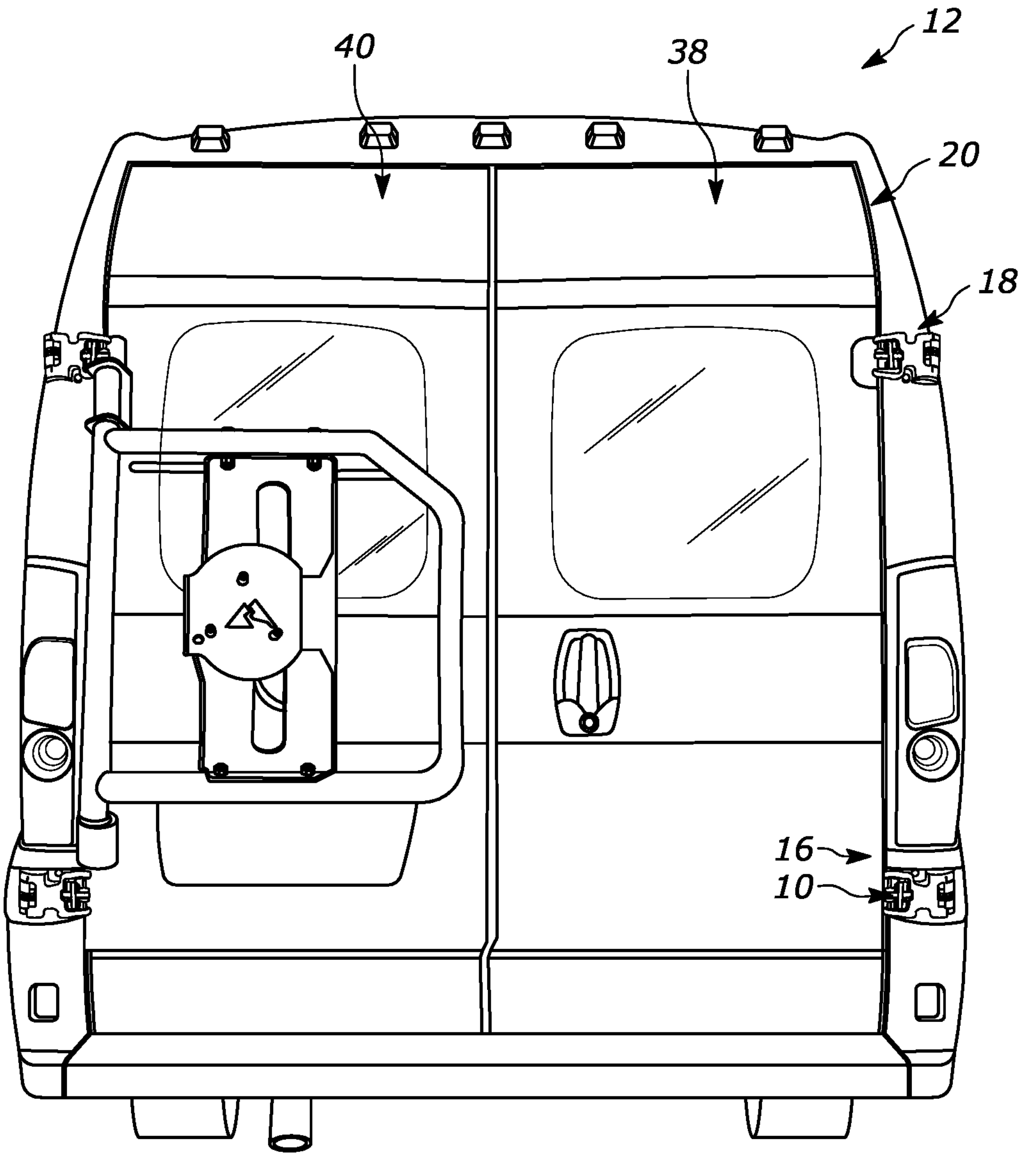
FIG. 30 shows a rear view of a vehicle having rear doors with multi-axial hinges with door stop systems installed on the multi-axial hinges, in accordance with one or more embodiments of the present disclosure; the view showing the vehicle with rear doors closed.
Figure 31:
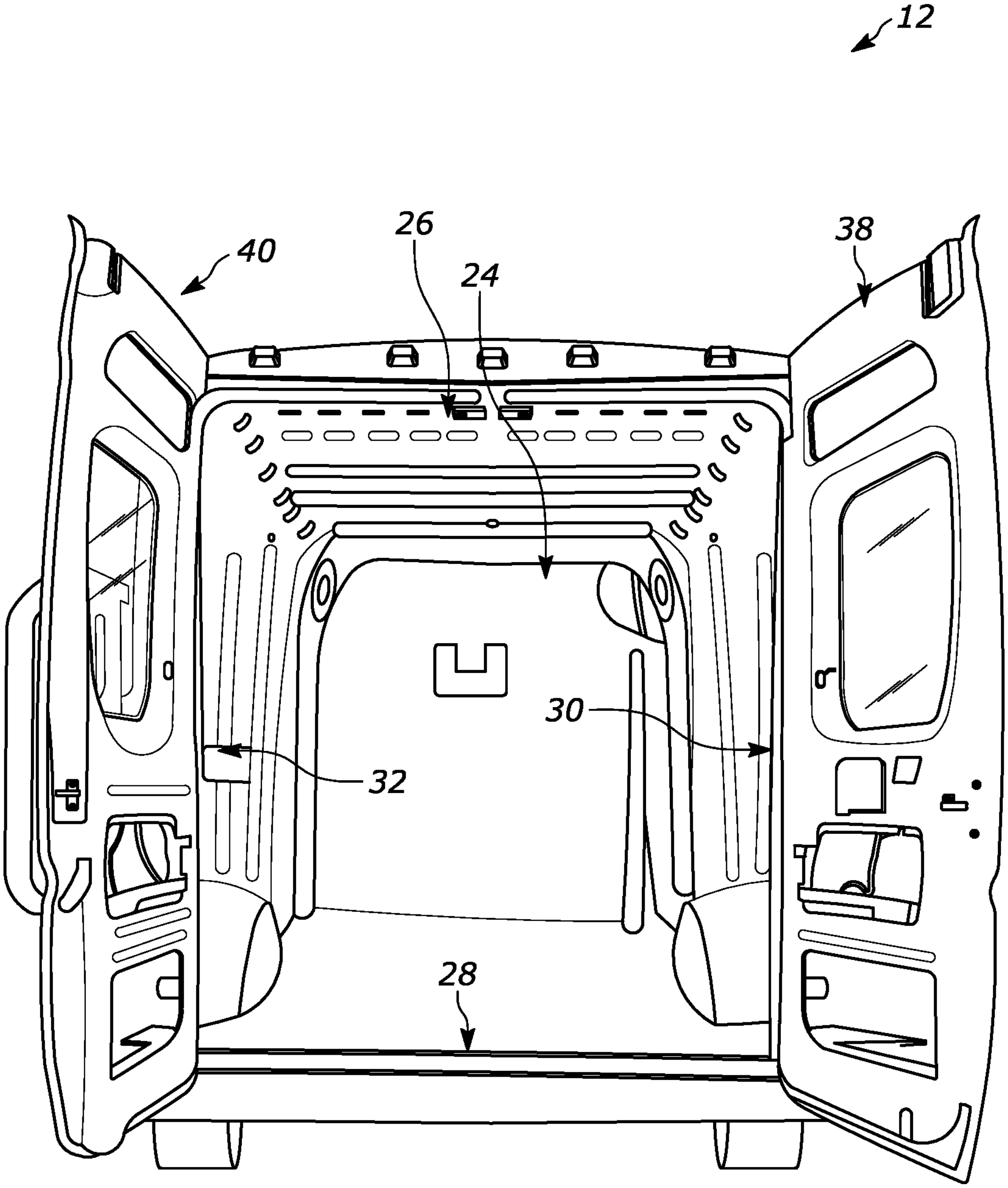
FIG. 31 shows a rear view of a vehicle having rear doors with multi-axial hinges with door stop systems installed on the multi-axial hinges, in accordance with one or more embodiments of the present disclosure; the view showing the vehicle with rear doors opened approximately 90 degrees.
Figure 32:
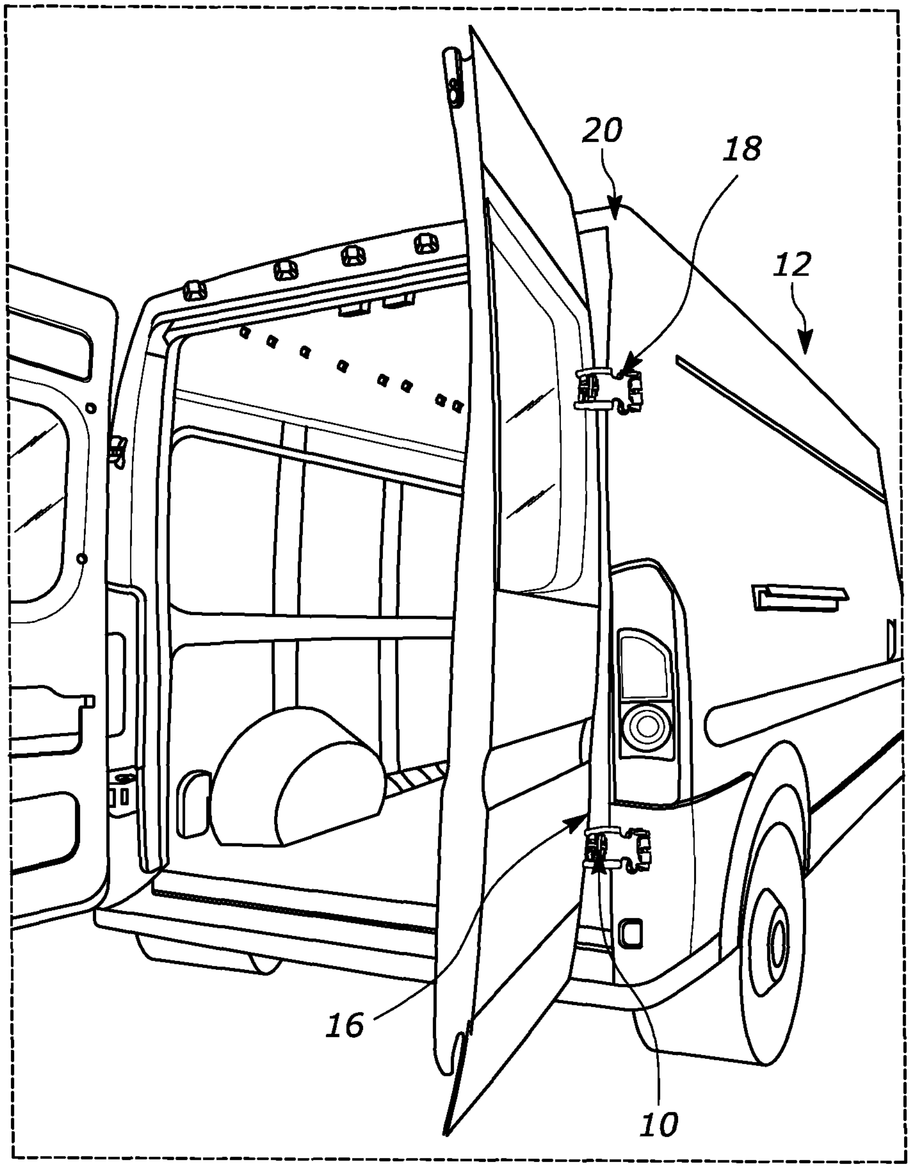
FIG. 32 shows a rear right perspective view of a vehicle having rear doors with multi-axial hinges with door stop systems installed on the multi-axial hinges, in accordance with one or more embodiments of the present disclosure; the view showing the vehicle with rear doors opened approximately 90 degrees.
Figure 33:
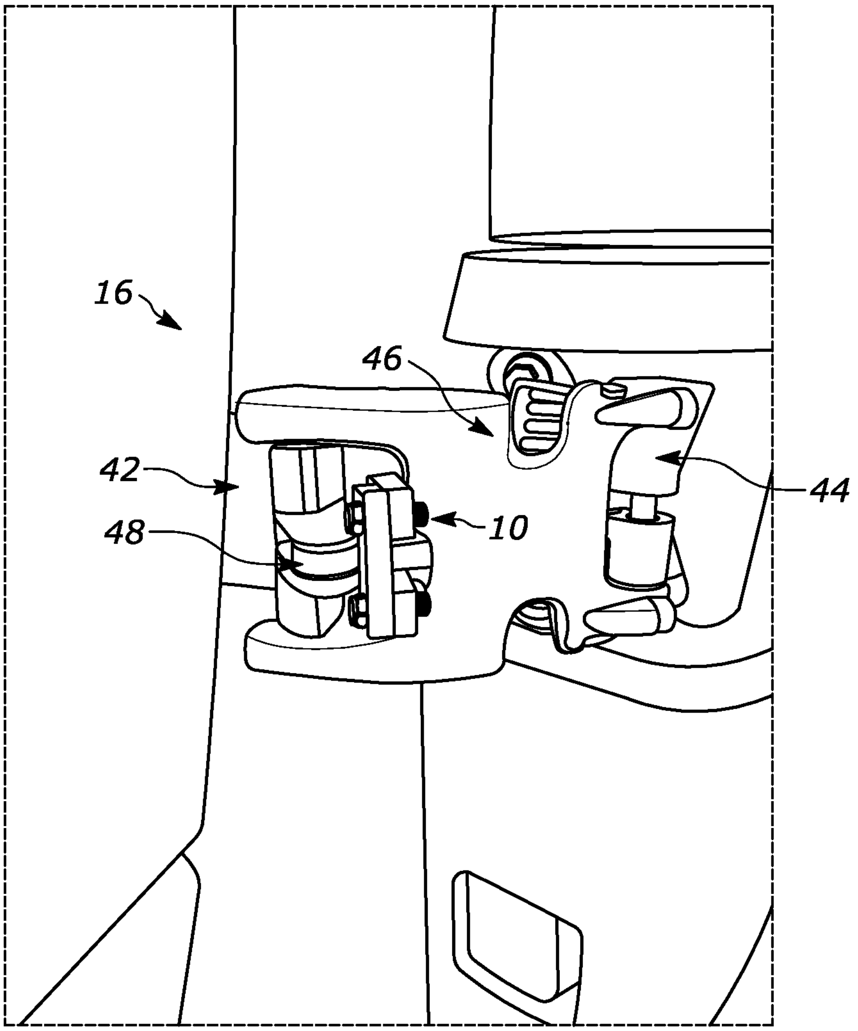
FIG. 33 shows a close up rear right perspective view of a multi-axial hinge of a vehicle having door stop systems installed on the multi-axial hinges, in accordance with one or more embodiments of the present disclosure; the view showing the vehicle with rear doors opened approximately 90 degrees.
Figure 34:
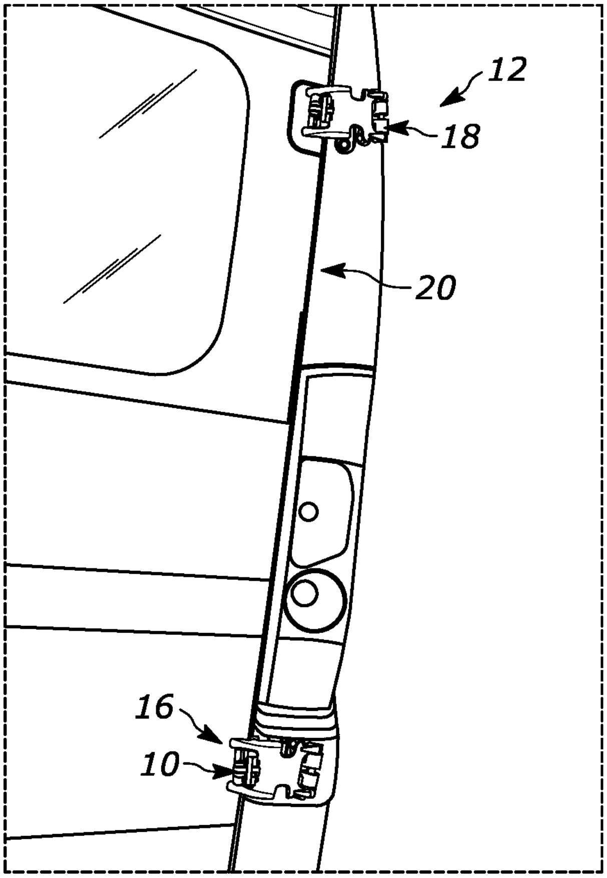
FIG. 34 shows a rear view of a right wing of a rear door of a vehicle having door stop systems installed on the multi-axial hinges, in accordance with one or more embodiments of the present disclosure; the view showing the right wing of a rear door in a closed position.
Figure 35:
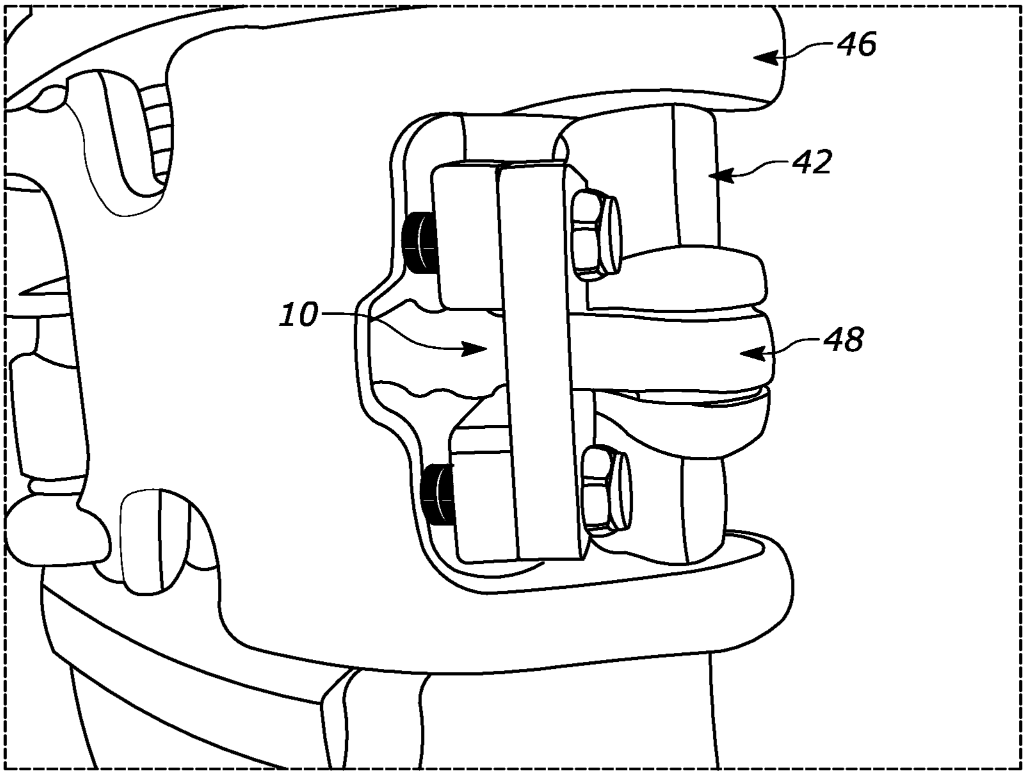
FIG. 35 shows a close up rearward right view of a multi-axial hinge of a vehicle having door stop systems installed on the multi-axial hinges, in accordance with one or more embodiments of the present disclosure; the view showing the multi-axial hinge in a closed position.
Figure 36:
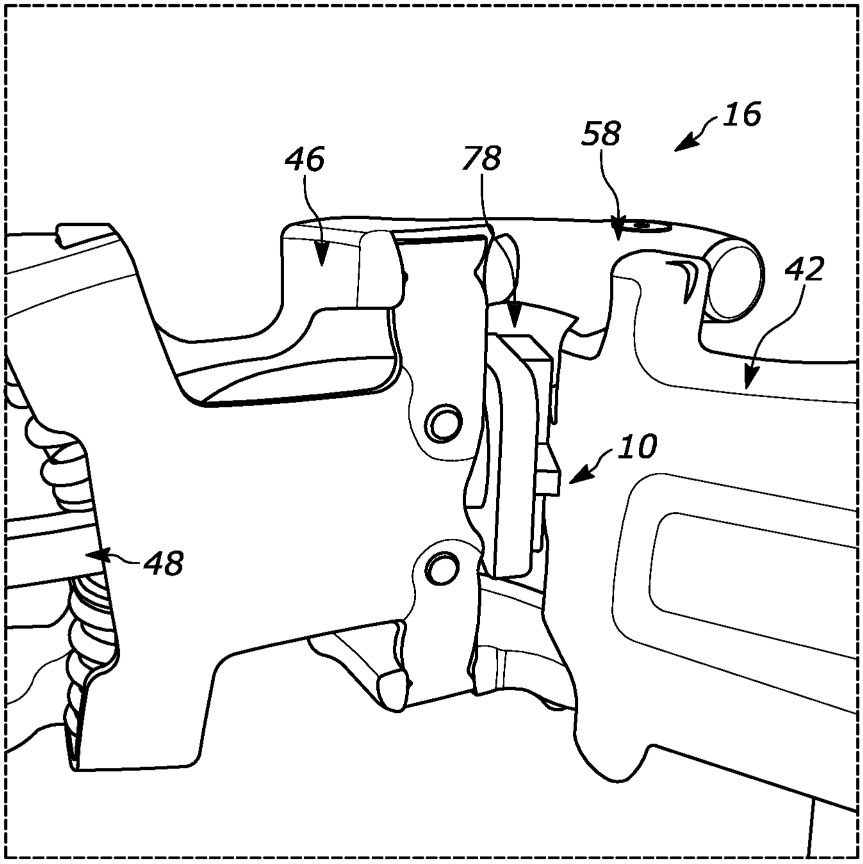
FIG. 36 shows a close up forward view of a multi-axial hinge of a vehicle having a door stop system installed, in accordance with one or more embodiments of the present disclosure; the view showing the multi-axial hinge in an open position.
Figure 37:
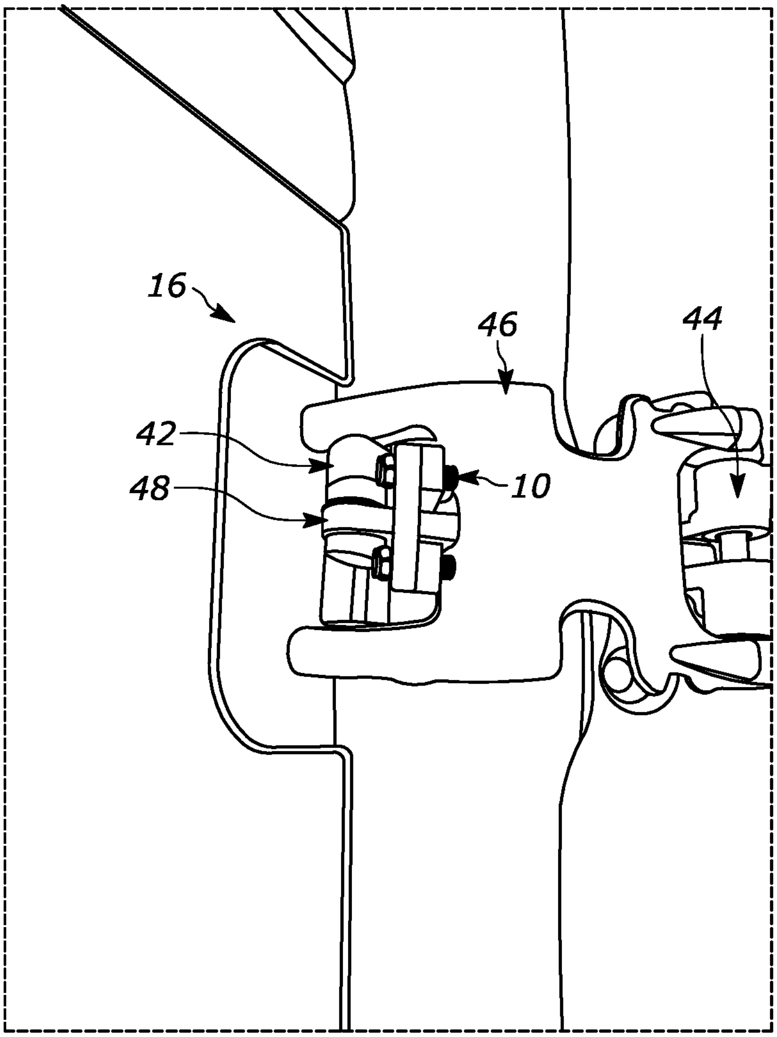
FIG. 37 shows a close up rearward view of a multi-axial hinge of a vehicle having a door stop system installed, in accordance with one or more embodiments of the present disclosure; the view showing the multi-axial hinge in an open position.
Figure 38:
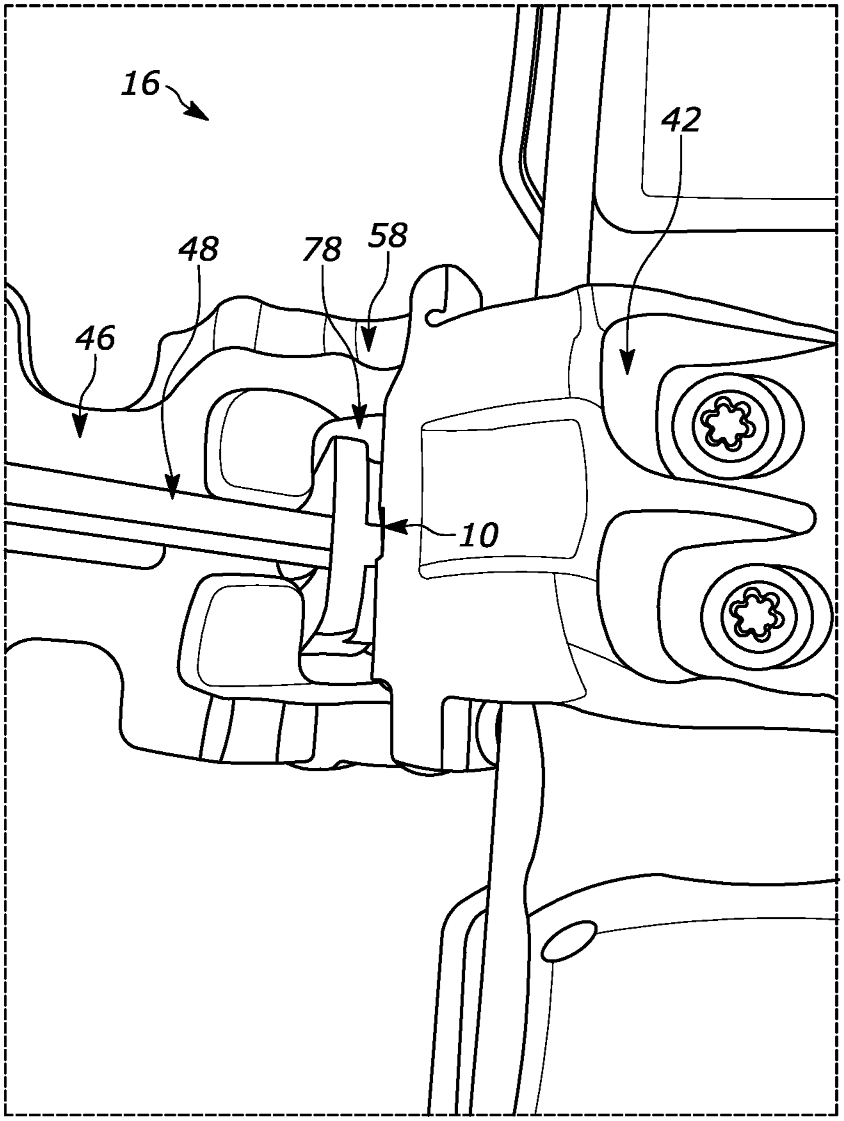
FIG. 38 shows a partial close up forward view of a multi-axial hinge of a vehicle having a door stop system installed, in accordance with one or more embodiments of the present disclosure; the view showing the multi-axial hinge in an open position.
Figure 39:
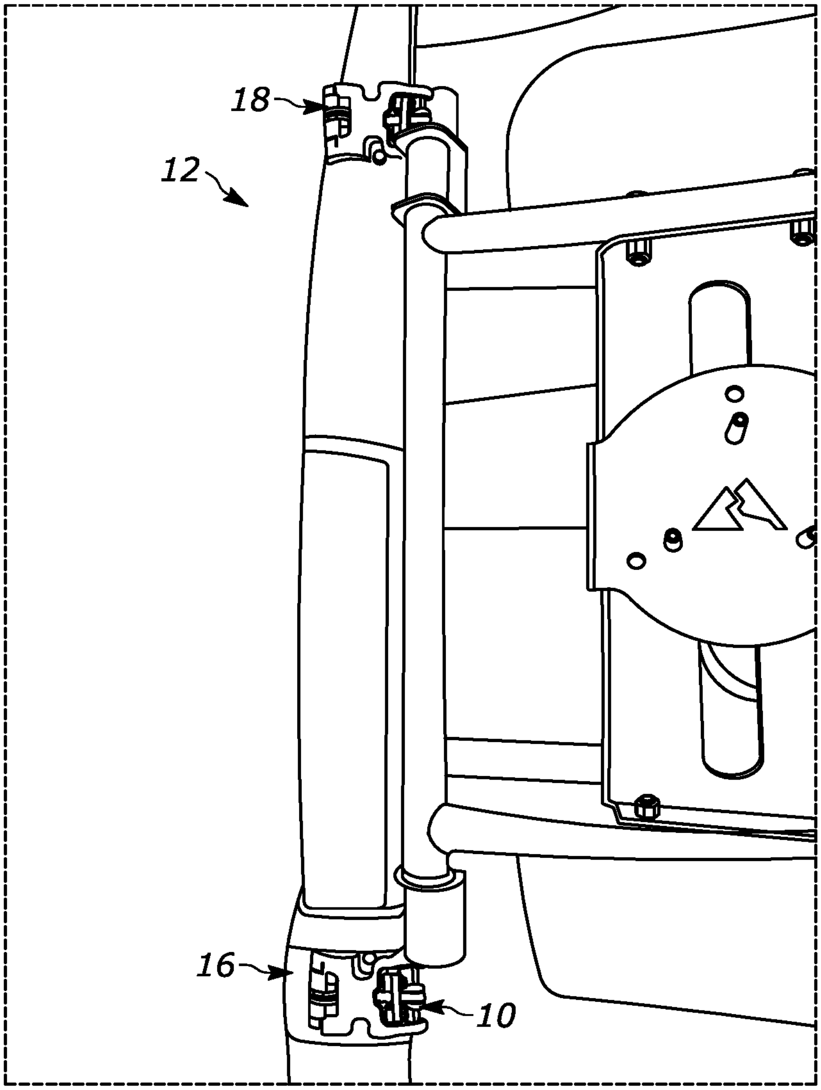
FIG. 39 shows a rear view of a left wing of a rear door of a vehicle having door stop systems installed on the multi-axial hinges, in accordance with one or more embodiments of the present disclosure; the view showing the left wing of a rear door in a closed position.
Figure 40:
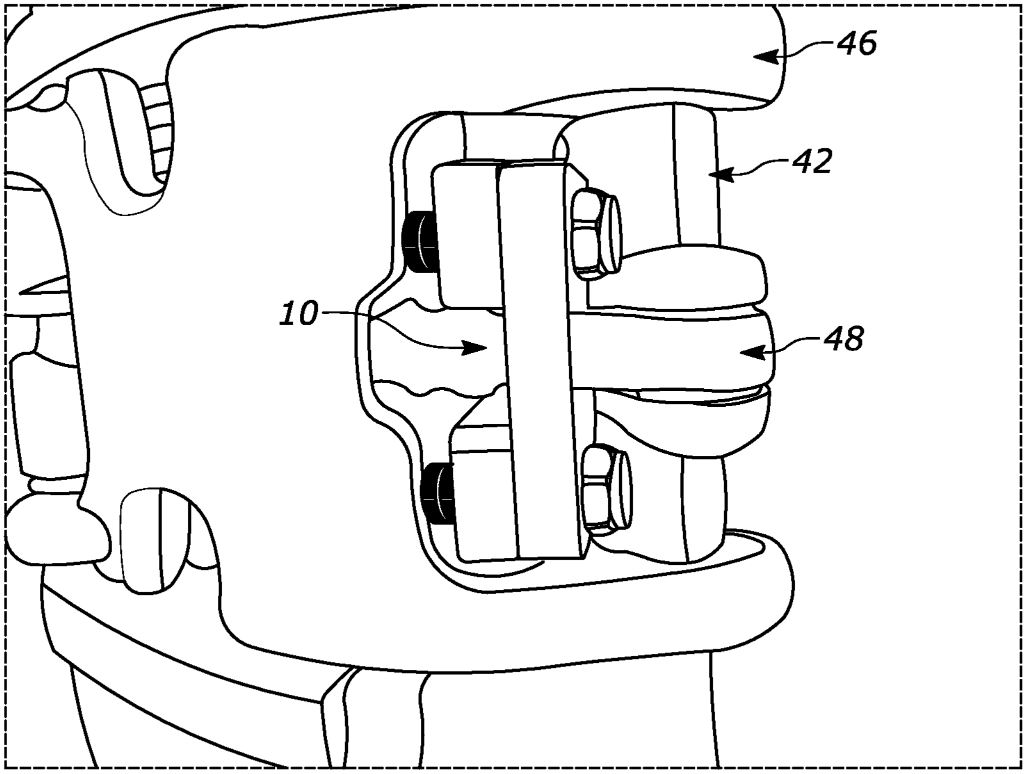
FIG. 40 shows a close up rearward right side view of a multi-axial hinge of a vehicle having a door stop system installed, in accordance with one or more embodiments of the present disclosure; the view showing the multi-axial hinge in a closed position.
Figure 41:
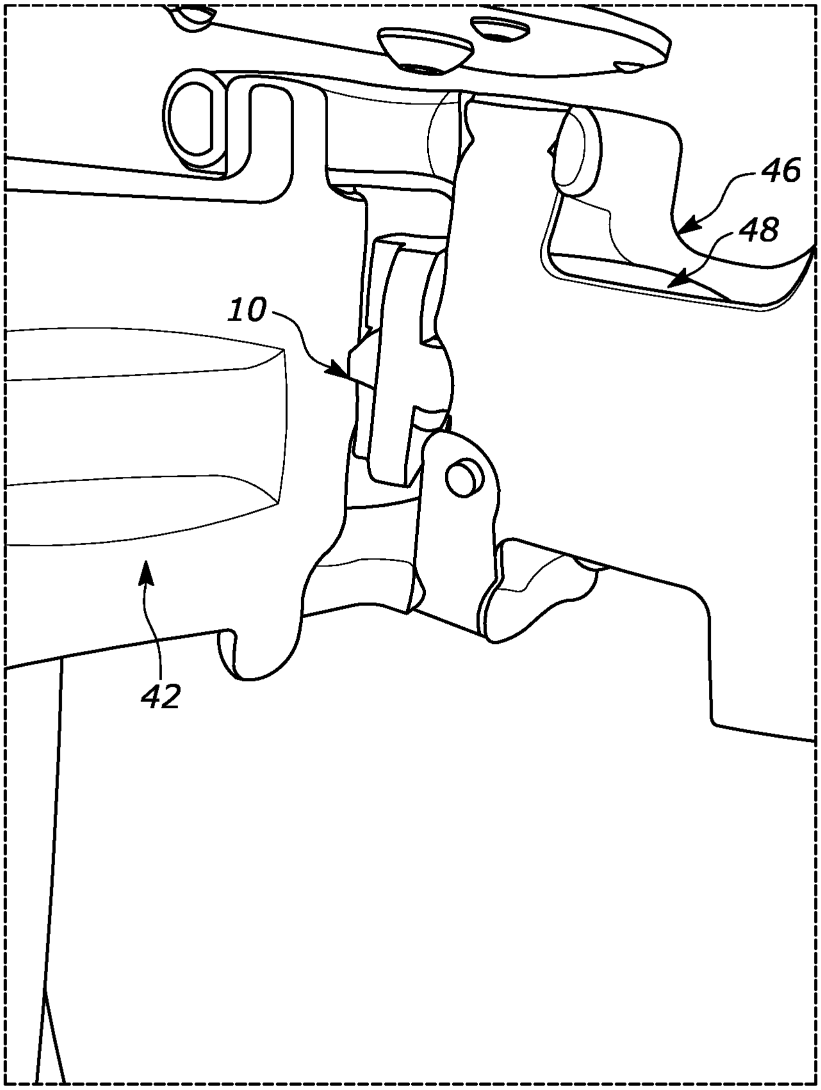
FIG. 41 shows a partial close up forward view of a multi-axial hinge of a vehicle having a door stop system installed, in accordance with one or more embodiments of the present disclosure; the view showing the multi-axial hinge in an open position.
Figure 42:
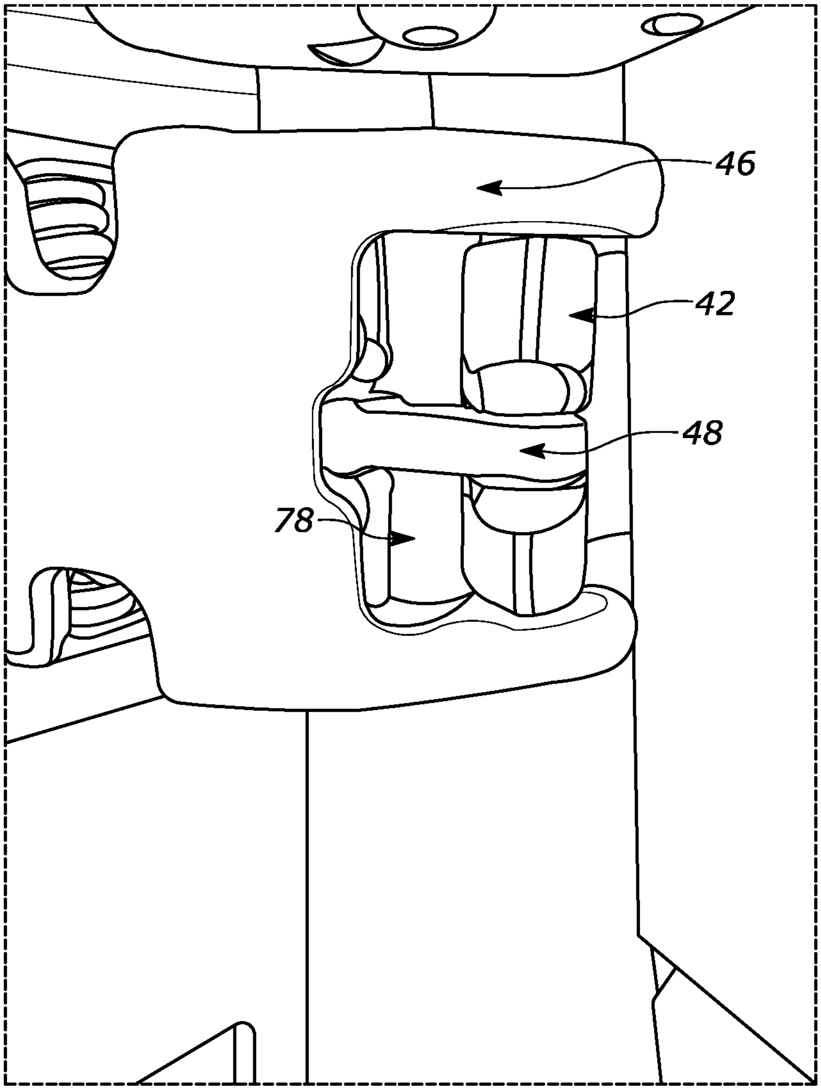
FIG. 42 shows a partial close up rearward view of a multi-axial hinge of a vehicle having a door stop system installed, in accordance with one or more embodiments of the present disclosure; the view showing the multi-axial hinge in an open position.
Figure 43:
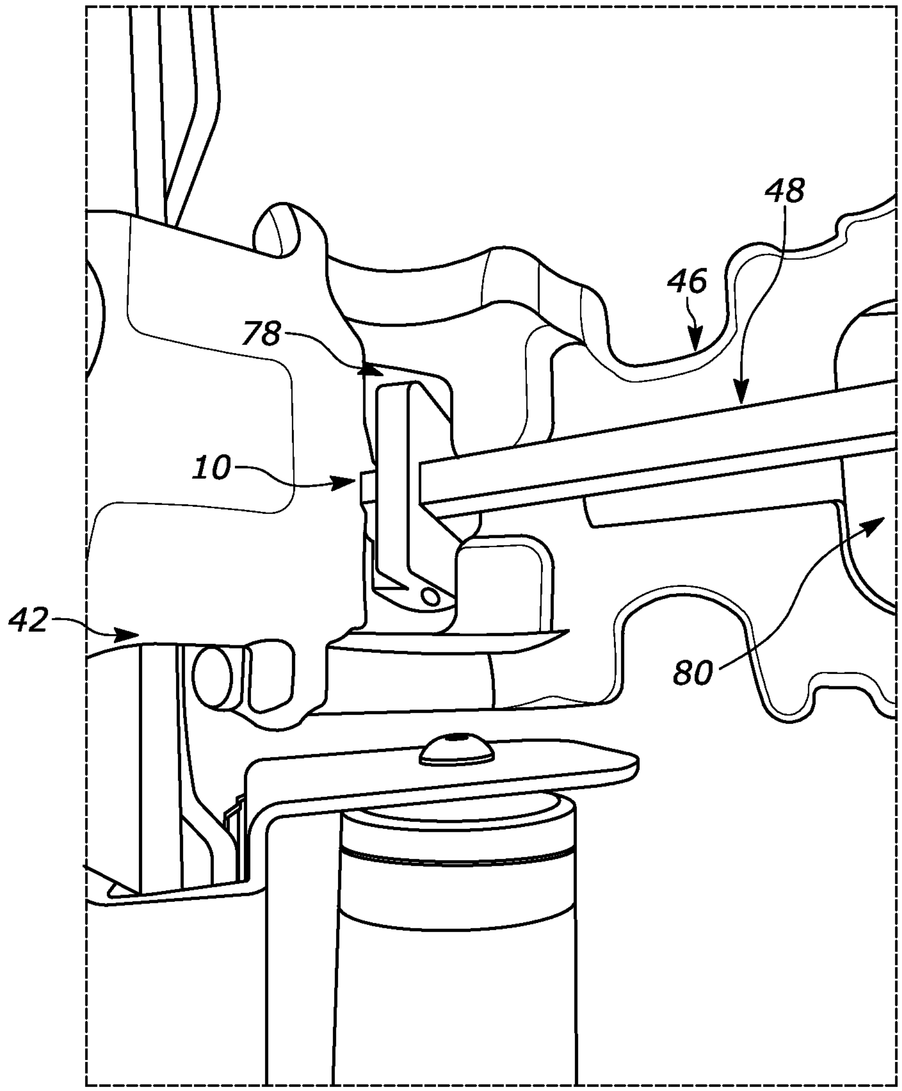
FIG. 43 shows a partial close up forward view of a multi-axial hinge of a vehicle having a door stop system installed, in accordance with one or more embodiments of the present disclosure; the view showing the multi-axial hinge in an open position.

In the following detailed description of the embodiments, reference is made to the accompanying drawings which form a part hereof, and in which is shown by way of illustration specific embodiments in which the disclosure may be practiced. The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure. It will be understood by those skilled in the art that various changes in form and details may be made without departing from the principles and scope of the invention. It is intended to cover various modifications and similar arrangements and procedures, and the scope of the appended claims therefore should be accorded the broadest interpretation so as to encompass all such modifications and similar arrangements and procedures. For instance, although aspects and features may be illustrated in or described with reference to certain figures or embodiments, it will be appreciated that features from one figure or embodiment may be combined with features of another figure or embodiment even though the combination is not explicitly shown or explicitly described as a combination. In the depicted embodiments, like reference numbers refer to like elements throughout the various drawings.

It should be understood that any advantages and/or improvements discussed herein may not be provided by various disclosed embodiments, or implementations thereof. The contemplated embodiments are not so limited and should not be interpreted as being restricted to embodiments which provide such advantages or improvements. Similarly, it should be understood that various embodiments may not address all or any objects of the disclosure or objects of the invention that may be described herein. The contemplated embodiments are not so limited and should not be interpreted as being restricted to embodiments which address such objects of the disclosure or invention. Furthermore, although some disclosed embodiments may be described relative to specific materials, embodiments are not limited to the specific materials or apparatuses but only to their specific characteristics and capabilities and other materials and apparatuses can be substituted as is well understood by those skilled in the art in view of the present disclosure.

It is to be understood that the terms such as "left, right, top, bottom, front, back, side, height, length, width, upper, lower, interior, exterior, inner, outer, and the like as may be used herein, merely describe points of reference and do not limit the present invention to any particular orientation or configuration.

As used herein, the term "and/or" includes all combinations of one or more of the associated listed items, such that "A and/or B" includes "A but not B," "B but not A," and "A as well as B," unless it is clearly indicated that only a single item, subgroup of items, or all items are present. The use of "etc." is defined as "et cetera" and indicates the inclusion of all other elements belonging to the same group of the preceding items, in any "and/or" combination(s).

As used herein, the singular forms "a," "an," and "the" are intended to include both the singular and plural forms, unless the language explicitly indicates otherwise. Indefinite articles like "a" and "an" introduce or refer to any modified term, both previously-introduced and not, while definite articles like "the" refer to a same previously-introduced term; as such, it is understood that "a" or "an" modify items that are permitted to be previously-introduced or new, while definite articles modify an item that is the same as immediately previously presented. It will be further understood that the terms "comprises," "comprising," "includes," and/or "including," when used herein, specify the presence of stated features, characteristics, steps, operations, elements, and/or components, but do not themselves preclude the presence or addition of one or more other features, characteristics, steps, operations, elements, components, and/or groups thereof, unless expressly indicated otherwise. For example, if an embodiment of a system is described at comprising an article, it is understood the system is not limited to a single instance of the article unless expressly indicated otherwise, even if elsewhere another embodiment of the system is described as comprising a plurality of articles.

It will be understood that when an element is referred to as being "connected," "coupled," "mated," "attached," "fixed," etc. to another element, it can be directly connected to the other element, and/or intervening elements may be present. In contrast, when an element is referred to as being "directly connected," "directly coupled," "directly engaged" etc. to another element, there are no intervening elements present. Other words used to describe the relationship between elements should be interpreted in a like fashion (e.g., "between" versus "directly between," "adjacent" versus "directly adjacent," "engaged" versus "directly engaged," etc.). Similarly, a term such as "operatively", such as when used as "operatively connected" or "operatively engaged" is to be interpreted as connected or engaged, respectively, in any manner that facilitates operation, which may include being directly connected, indirectly connected, electronically connected, wirelessly connected or connected by any other manner, method or means that facilitates desired operation. Similarly, a term such as "communicatively connected" includes all variations of information exchange and routing between two electronic devices, including intermediary devices, networks, etc., connected wirelessly or not. Similarly, "connected" or other similar language particularly for electronic components is intended to mean connected by any means, either directly or indirectly, wired and/or wirelessly, such that electricity and/or information may be transmitted between the components.

It will be understood that, although the ordinal terms "first," "second," etc. may be used herein to describe various elements, these elements should not be limited to any order by these terms unless specifically stated as such. These terms are used only to distinguish one element from another; where there are "second" or higher ordinals, there merely must be a number of elements, without necessarily any difference or other relationship. For example, a first element could be termed a second element, and, similarly, a second element could be termed a first element, without departing from the scope of example embodiments or methods.

Similarly, the structures and operations discussed herein may occur out of the order described and/or noted in the figures. For example, two operations and/or figures shown in succession may in fact be executed concurrently or may sometimes be executed in the reverse order, depending upon the functionality/acts involved. Similarly, individual operations within example methods described below may be executed repetitively, individually or sequentially, to provide looping or other series of operations aside from single operations described below. It should be presumed that any embodiment or method having features and functionality described below, in any workable combination, falls within the scope of example embodiments. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

In one or more arrangements, a door stop system 10 is presented for restricting range of motion of hinges. In the arrangements shown, door stop system 10 is primarily described in association with use on a vehicle 12 to restrict the range of motion of multi-axial hinges of a rear door 20 of vehicle 12. However, the embodiments are not so limited. Rather, it is contemplated that the arrangements may be used to restrict range of motion of various types of hinges in connection with various vehicular and non-vehicular applications. The system is merely shown and described as being used in the context of multi-axial hinges and vehicle doors for ease of description and as one of countless examples.

Vehicle 12:

Vehicle 12 may be formed of any suitable size, shape, and design and is configured to facilitate transportation, storage, and/or occupancy. While a vehicle 12 is shown and described herein, the use of door stop system 10 on rear door 20 of vehicle 12 is only one of countless examples of applications having hinges that may benefit from limiting range of motion using system 10.

In the arrangement shown, as one example, vehicle 12 is what is known as a RAM "ProMaster" van which is known for being used for a wide variety of uses such as being small campers, utility vehicles, and work vehicles, among a great number of other uses. However, any other make, model, year, or type of vehicle is hereby contemplated for use and reference to and depiction of a RAM ProMaster van is only one example of a vehicle 12.

In the arrangement shown, as one example, rear door 20 covers a generally rectangular shaped opening 24 having a bottom edge or door sill 28, a top edge 26, a right edge 30 and a left edge 32. However, any other size, shape, or design is hereby contemplated for opening 24.

In the arrangement shown, as one example, rear door 20 includes a right wing 38 operably connected by a first set of multi-axial hinges 16 and 18 to the vehicle 12 along right edge 30 of opening 24. In this example arrangement, rear door 20 also includes a left wing 40 operably connected by a second set of multi-axial hinges 16 and 18 to the vehicle 12 along left edge 32 of opening 24. In one arrangement, right wing 38 and left wing 40 and the multi-axial hinges 16, 18 associated there with are generally mirror images of one another.

Hinges 16 and 18:

In the arrangements shown, right wing 38 and left wing 40 of rear door 20 are each connected to vehicle 12 by a set of multi-axial hinges 16 and 18. Some example multi-axial hinges 16 and 18 for vehicles are shown and described in AU Patent Application 2008/255168 to DE MOLLI ROMEO, MARANDO FRANCESCO, titled "HINGE FOR VEHICLE DOOR, IN PARTICULAR OF A VAN" and published Jul. 9, 2009, which is hereby incorporated by reference in its entirety. Although, the arrangements are primarily described in connection with multi-axial hinges, the embodiments are not so limited. Rather, it is contemplated that in one or more arrangement, system 10 may be configured to restrict the range of motion of various different types of hinges.

In the arrangement shown, as one example, multi-axial hinges 16/18 each include a first end member 42, a second end member 44, a main link 46 operably connecting first end member 42 to second end member 44, and a secondary link 48 operably connecting first end member 42 to second end member 44. First end member 42 is configured to be fastened to wing 38 or wing 40 of rear door 20. Second end member 44 configured to be fastened to a fixed part of vehicle 12.

In this example, main link 46 has a generally rectangular elongated central portion 50 extending between an upper edge 52, a lower edge 54, and opposing ends 56. In this example, main link 46 has arms 58 that extend outward from ends 56 of central portion 50 at upper edge 52 and lower edge 54. In this example, holes are positioned at outward ends of arms 58 to facilitate hinged connection with first end member 42 and second end member 44. In this example, main link 46, is pivotally connected to first end member 42 by a pin 68, which extends through holes in arms 58 at one end of main link 46 and an arm 60 of first end member 42. Main link 46, is similarly pivotally connected to second end member 44 by a pin 70, which extends through holes in arms 58 at the other end of main link 46 and an arm 62 of second end member 44.

Secondary link 48 is pivotally connected to first end member 42 by a pin 72, which extends through holes positioned in arms 64 of first end member 42 and at one end of secondary link 48. Secondary link 48 is similarly pivotally connected to second end member 44 by a pin 74, which extends through holes positioned in arms 66 of second end member 44 and at the other end of secondary link 48. In this example, bushings 88 made of an appropriate material (for example, nylon or PTFE) are positioned around pins 68, 70, 72, and 74 to facilitate pivoting of main link 46 and secondary link 48 about pins 68, 70, 72, and 74.

In this example arrangement, arms 60 and 64 position pins 68 and 72 a distance apart from one another on first end member 42. Arms 62 and 66 similarly position pins 70 and 74 a distance apart from one another on second end member 44. In this arrangement, main link 46, secondary link 48, first end member 42, and second end member 44 form a quadrilateral linkage, which facilitates 270 degree rotation of first end member 42 relative to second end member 44. In this example arrangement, the secondary link 48 is shaped so that it does not interfere with movement of other components.

In this example arrangement, main link 46 has cutout openings 78 and 80 that extend inward from each end of main link 46 between arms 58 to ends 56 of center portion 50. Cutout openings 78 and 80 facilitate uninhibited rotation of end members 42 and/or 44 about axes of pins 68 and/or 70.

System:

In one or more arrangements of the disclosure, a system is presented for limiting the range of motion of hinges 16, 18. With reference to the figures, for example, a door stop system 10 (or hinge limiting system 10 or simply system 10) is presented that is used in association with a vehicle 12.

System 10 is formed of any suitable size, shape, and design and is configured to connect with a hinge (e.g., hinge 16 and/or hinge 18) in a manner so as to restrict the range of motion. In the arrangement shown, as one example, system 10 is configured to be positioned and held within a cutout opening in main link 46 (e.g., cutout opening 78 or cutout opening 80) and operate as a spacer between main link 46 and first end member 42 or between main link 46 and second end member 44. For example, with respect to rotation of first end member 42 relative to main link 46, in the example arrangement shown, a portion of system 10 in cutout opening 78 becomes clamped between main link 46 and a portion of first end member 42 proximate to pin 68 when first end member 42 is rotated approximately 100 degrees+/−approximately 10 degrees.

In the arrangement shown, as one example, system 10 includes a first stop component 100, a second stop component 102, and a set of fasteners 104. However, the arrangements are not so limited. Rather, it is contemplated that in some various arrangements, system 10 may includes any number of various different components to facilitate connection with a hinge in a manner so as to limit the range of motion.

First Stop Component 100:

First stop component 100 is formed of any suitable size, shape, and design and is configured to extend around a rearward facing side of secondary link 48 and, when connected with second stop component 102 positioned forward of secondary link 48, operably connect system 10 with secondary link 48 and hold in position within a cutout opening 78 and/or cutout opening 80 of main link 46.

In the arrangement shown, as one example, first stop component 100 has a generally rectangular C-shape having a rear portion 110, a top portion 112, and a bottom portion 114, and holes 116. In this example arrangement, rear portion 110 has an elongated generally rectangular shape having a front 120, a back 122, and opposing sides 124 extending between an upper end 126 and a lower end 128.

In this example arrangement, top portion 112 extends forward from upper end 126 of rear portion 110. In this example arrangement, top portion 112 has an elongated generally rectangular shape having a top 132, a bottom 134, and opposing sides 136 extending from a rearward end 138, where top portion 112 is connected to upper end 126 of rear portion 110, to a forward end 140.

In this example arrangement, bottom portion 114 extends forward from lower end 128 of rear portion 110. In this example arrangement, bottom portion 114 has an elongated generally rectangular shape having a top 144, a bottom 146, and opposing sides 148 extending from a rearward end 150, where bottom portion 114 is connected to lower end 128 of rear portion 110, to a forward end 152.

In this example arrangement, first stop component 100 has a pair of holes 116 extending through rear portion 110 between opposing sides 124 to facilitate connection with second stop component 102 by using fasteners 104 extending through holes 116. However, the embodiments are not so limited. Rather, it is contemplated that in one or more arrangements, holes 116 may be positioned at various locations of first stop component 100 to facilitate connection with second stop component 102.

Second Stop Component 102:

Second stop component 102 is formed of any suitable size, shape, and design and is configured to extend around a forward facing side of secondary link 48 and, when connected with first stop component 100 that is positioned rearward of secondary link 48, operably connect system 10 with secondary link 48 and hold first stop component 100 in position within an cutout opening 78 or 80 of main link 46 so as to restrict range of motion of the hinge (e.g., hinge 16 and/or hinge 18).

In the arrangement shown, as one example, second stop component 102 has a generally rectangular C-shape having a front portion 160, a top portion 162, a bottom portion 164, and holes 166. In this example arrangement, front portion 160 has an elongated generally rectangular shape having a front 170, a back 172, and opposing sides 174 extending between an upper end 176 and a lower end 178.

In this example arrangement, top portion 162 extends rearward from upper end 176 of front portion 160. In this example arrangement, top portion 162 has an elongated generally rectangular shape having a top 182, a bottom 184, and opposing sides 186 extending from a forward end 188, where top portion 162 is connected to upper end 176 of front portion 160, to a rearward end 190.

In this example arrangement, bottom portion 164 extends rearward from lower end 178 of front portion 160. In this example arrangement, bottom portion 164 has an elongated generally rectangular shape having a top 194, a bottom 196, and opposing sides 198 extending from a forward end 200, where bottom portion 164 is connected to lower end 178 of front portion 160, to a rearward end 202.

In the arrangement shown, as one example, second stop component 102 has holes 166 to facilitate connection with first stop component 100. More specifically, in this example arrangement, second stop component 102 has a hole 166 extending through rearward end 190 of top portion 162 between opposing sides 186 and a hole 166 extending through rearward end 202 of bottom portion 164 between opposing sides 198.

In this example arrangement, top portion 162 and bottom portion 164 of second stop component 102 are longer than top portion 112 and bottom portion 114 of first stop component 100. In this example arrangement, when first stop component 100 and second stop component 102 are connected together, top portion 112 and bottom portion 114 of first stop component 100 do not extend to front portion 160 of second stop component 102. As a result, overall thickness of a front end of system 10 is thinner than overall thickness of a back end of system 10. The thinner front end of system 10 helps to avoid contact with first end member 42 and/or second end member 44 that would interfere with movement of components. However, the embodiments are not so limited. Rather, it is contemplated that first stop component 100 and second stop component 102 may be implemented with any shape suitable to facilitate unincumbered movement of hinge between a closed position and an intermediate position, where a user desires to limit the range of motion.

In various different arrangements, first stop component 100 and second stop component 102 may be formed of various different natural or synthetic materials including but not limited to metals, plastics, rubber, composites, laminins, of any other material. In one or more arrangements, first stop component 100 and second stop component 102 have a generally planar shape, thereby permitting first stop component 100 and second stop component 102 to be formed from plate steel or other plate or sheeted material. For example, in some various arrangements, first stop component 100 and second stop component 102 may be cut, stamped, milled, or otherwise formed from plate steel. In this manner, cost and time for manufacture of first stop component 100 and second stop component 102 can be reduced.

Fasteners 104:

In the arrangement shown, as one example, first stop component 100 and second stop component 102 are configured to be connected together using fasteners 104 (e.g.; threaded bolts) extending through holes 166 in second stop component 102 and holes 116 in first stop component 100. However, the embodiments are not so limited. Rather, it is contemplated that in various arrangements, first stop component 100 and second stop component 102 may be connected using various methods or means including but not limited to, for example, screws, bolts, clamps, pins, rivets, welding, snap connectors, friction fit connectors, stitching, hook and loop connectors, adhesives, chemical bonding, and/or any other process or means that results in a permanent or semi-permanent connection.

In Operation:

As an illustrative example, system 10 may be used as a door stop for a right wing 38 or left wing 40 of rear door 20 of vehicle 12. For example, to install system 10 as a door stop on right wing 38, system 10 may be installed on either hinge 16 and/or hinge 18 connecting right wing 38 to vehicle 12. To install system 10 on one of the hinges 16/18, right wing 38 of rear door 20 is partially opened (e.g., to 90 degrees) to provide access to forward and rearward side of the hinge 16/18. Second stop component 102 is positioned around a forward side of secondary link 48 with top portion 112 extending rearward over secondary link 48 and through cutout opening 78 or 80 and bottom portion 114 extending rearward under secondary link 48 and through the cutout opening 78/80. At the same time, first stop component 100 is inserted through the cutout opening 78/80 and is aligned with second stop component 102 so that first stop component 100 and second stop component 102 encircle secondary link 48. In the arrangement shown, as one example, first stop component 100 and second stop component 102 are then connected together by inserting bolt-type fasteners 104 through holes 116 in first stop component 100 and holes 166 second stop component 102 and connected with corresponding nuts and tightened to complete installation.

Range of Motion Adjustment:

In one or more arrangements, system 10 is configurable to permit a user to adjust the range of motion of a hinge (e.g., hinge 16 and/or hinge 18) by changing the thickness of the portion of system 10 that is positioned in the cutout opening 78 and/or cutout opening 80. In one or more arrangements, system 10 may be sold as a kit having multiple first stop components 100 or second stop components 102 of different thicknesses. A user may select from the provided first stop components 100 or second stop components 102 to provide a system 10 having a suitable thickness required to achieve the desired range of motion. Additionally or alternatively, in one or more arrangements, second stop component 102 and in first stop component 100 may be stacked with multiple first stop components 100 or second stop components 102 to achieve the desired range of motion. Additionally or alternatively, in one or more arrangements, second stop component 102 and in first stop component 100 may be stacked with one or more spacers 210 (not shown) to achieve the desired range of motion.

From the above discussion, it will be appreciated that a door stop system is presented that herein improves upon the state of the art. More specifically, and without limitation, it will be appreciated that, in one or more embodiments, the door stop system is presented: that may be installed in vehicles; that is easy to use; that can restrict range of motion; that can be used to adjust the range of motion of a door; that prevents contact with an exterior of the vehicle; that may be installed in a wide variety of vehicles; that is durable; that is robust; that is easy to install; that is relatively inexpensive; that is hidden from view; and/or that is high quality among countless other advantages and improvements.

It will be appreciated by those skilled in the art that other various modifications could be made to the device without parting from the spirit and scope of this disclosure. All such modifications and changes fall within the scope of the claims and are intended to be covered thereby.

What is claimed:

1. A system for restricting a range of motion of a multi-axial hinge having a main link and a secondary link pivotally connected between a first end member and a second end member, comprising:

a first stop component;

a second stop component;

one or more fasteners configured to connect the first stop component to the second stop component;

wherein the first stop component and the second stop component are configured to be positioned around the secondary link to surround the secondary link and are connected together by the one or more fasteners;

wherein, when the first stop component and the second stop component are positioned around the secondary link and connected together, a portion of at least one of the first stop component and the second stop component extend through an opening positioned at an end of the main link; and wherein the portion of at least one of the first stop component and the second stop component limits the range of motion of the multi-axial hinge;

wherein the first stop component and the second stop component encircle the secondary link when connected together.

2. The system of claim 1, wherein the opening is positioned between the first end member and the main link;

wherein the portion of at least one of the first stop component and the second stop component is configured to prevent the first stop component from being pivoted against the main link.

3. A system for restricting a range of motion of a multi-axial hinge having a main link and a secondary link pivotally connected between a first end member and a second end member, comprising:

a first stop component;

a second stop component;

one or more fasteners configured to connect the first stop component to the second stop component;

wherein the first stop component and the second stop component are configured to be positioned around the secondary link to surround the secondary link and are connected together by the one or more fasteners;

wherein, when the first stop component and the second stop component are positioned around the secondary link and connected together, a portion of at least one of the first stop component and the second stop component extend through an opening positioned at an end of the main link; and wherein the portion of at least one of the first stop component and the second stop component limits the range of motion of the multi-axial hinge;

wherein the first stop component is generally C-shaped and the second stop component is generally C-shaped.

4. The system of claim 1, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion.

5. The system of claim 1, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion;

wherein the first upper portion and the first lower portion are shorter than the second upper portion and the second lower portion.

6. The system of claim 1, wherein the one or more fasteners extend through holes in the first stop component and holes in the second stop component.

7. The system of claim 1, further comprising a spacer operably connected in stacked arrangement with the first stop component and the second stop component.

8. The system of claim 1, further comprising a plurality of spacers operably connected in stacked arrangement with the first stop component and the second stop component.

9. The system of claim 1, wherein the first end member of the multi-axial hinge is capable of being rotated 270 degrees relative to the second end member of the multi-axial hinge;

wherein, when the first stop component and the second stop component are configured to be positioned around the secondary link to surround the secondary link and within the opening in the main link, the first stop component and the second stop component prevent the first end member from being rotated more than approximately 100 degrees relative to the second end member.

10. The system of claim 1, wherein the thickness between the first stop component and the second stop component is adjustable to adjust a range of motion of the multi-axial hinge.

11. A method for restricting a range of motion of a multi-axial hinge having a main link and a secondary link pivotally connected between a first end member and a second end member, comprising:

positioning a first stop component on a forward side of the secondary link;

positioning a second stop component on a rearward side of the secondary link;

connecting the first stop component and the second stop component together using one or more fasteners so that the first stop component and the second stop component surround the secondary link;

wherein, when the first stop component and the second stop component are positioned around the secondary link and are connected together, a portion of at least one of the first stop component and the second stop component extend through an opening positioned at an end of the main link; and wherein the portion of at least one of the first stop component and the second stop component limits the range of motion of the multi-axial hinge;

wherein the first stop component is generally C-shaped and the second stop component is generally C-shaped.

12. The method of claim 11, wherein the opening is positioned between the first end member and the main link;

wherein the portion of at least one of the first stop component and the second stop component is configured to prevent the first stop component from being pivoted against the main link.

13. The method of claim 11, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion.

14. The method of claim 11, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion;

wherein the first upper portion and first lower portion are shorter than the second upper portion and the second lower portion.

15. The method of claim 11, wherein connecting the first stop component and the second stop component together includes placing the one or more fasteners through holes in the first stop component and holes in the second stop component.

16. The method of claim 11, further comprising operably connecting a spacer to at least one of the first stop component and the second stop component.

17. The method of claim 11, further comprising operably connecting a plurality of spacers to at least one of the first stop component and the second stop component.

18. The method of claim 11, wherein the first end member of the multi-axial hinge is capable of being rotated 270 degrees relative to the second end member of the multi-axial hinge;

wherein, when the first stop component and the second stop component are positioned around the secondary link and within the opening in the main link, the first stop component and the second stop component prevent the first end member from being rotated more than approximately 100 degrees relative to the second end member.

19. A system for restriction a range of motion of a multi-axial hinge having a main link and a secondary link pivotally connected between a first end member and a second end member, comprising:

a first stop component;

a second stop component;

one or more fasteners configured to connect the first stop component to the second stop component;

wherein the first stop component and the second stop component are configured to surround the secondary link and are connected together by the one or more fasteners;

wherein, when the first stop component and the second stop component are positioned around the secondary link and connected together, a portion of at least one of the first stop component and the second stop component extend through an opening positioned between the main link and the first end member; and wherein the portion of at least one of the first stop component and the second stop component limits the range of motion of the multi-axial hinge;

wherein the first end member of the multi-axial hinge is capable of being rotated 270 degrees relative to the second end member of the multi-axial hinge;

wherein, when the first stop component and the second stop component are configured to be positioned around the secondary link and within the opening in the main link, the first stop component and the second stop component prevent the first end member from being rotated more than approximately 100 degrees relative to the second end member.

20. The system of claim 19, wherein the opening is positioned between the first end member and the main link;

wherein the portion of at least one of the first stop component and the second stop component is configured to prevent the first stop component from being pivoted against the main link.

21. The system of claim 19, when the first stop component and the second stop component encircle the secondary link when connected together.

22. The system of claim 19, wherein the first stop component is generally C-shaped and the second stop component is generally C-shaped.

23. The system of claim 19, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion.

24. The system of claim 19, wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion;

wherein the first upper portion and the first lower portion are shorter than the second upper portion and the second lower portion.

25. The system of claim 19, wherein the one or more fasteners extend through holes in the first stop component and holes in the second stop component.

26. The system of claim 19, further comprising a spacer operably connected in stacked arrangement with the first stop component and the second stop component.

27. The system of claim 19, further comprising a plurality of spacers operably connected in stacked arrangement with the first stop component and the second stop component.

28. The system of claim 19, wherein the thickness of the system is adjustable to adjust a range of motion of the multi-axial hinge.

29. A system for restriction a range of motion of a multi-axial hinge having a main link and a secondary link pivotally connected between a first end member and a second end member, comprising:

a first stop component;

a second stop component;

one or more fasteners configured to connect the first stop component to the second stop component;

wherein the first stop component and the second stop component are configured to surround the secondary link and be connected together by the one or more fasteners;

wherein, when the first stop component and the second stop component are positioned around the secondary link and connected together, a portion of at least one of the first stop component and the second stop component extend through an opening positioned at an end of the main link; and wherein the portion of at least one of the first stop component and the second stop component limits the range of motion of the multi-axial hinge;

wherein the first stop component has an elongated rear portion extending from an upper end to a lower end;

wherein the first stop component has a first upper portion extending forward from the upper end of the rear portion;

wherein the first stop component has a first lower portion extending forward from the lower end of the rear portion;

wherein the second stop component has an elongated front portion extending from an upper end to a lower end;

wherein the first stop component has a second upper portion extending rearward from the upper end of the front portion;

wherein the first stop component has a second lower portion extending rearward from the lower end of the front portion.

30. The system of claim 29, wherein the first upper portion and the first lower portion are shorter than the second upper portion and the second lower portion.

31. The system of claim 1, wherein the first stop component and the second stop component are configured to completely encircle the secondary link when connected together.

32. The system of claim 19, wherein the first stop component and the second stop component are configured to completely surround the secondary link when connected together.

* * * * *